US012789197B2

(12) United States Patent
Fauth et al.

(10) Patent No.: US 12,789,197 B2
(45) Date of Patent: *Nov. 10, 2026

(54) MILLING SYSTEM

(71) Applicant: Fritsch Milling & Sizing, Inc., Pittsboro, NC (US)

(72) Inventors: Melissa Fauth, Chapel Hill, NC (US); Andrew Winson, Milton (GB)

(73) Assignee: Fritsch Milling & Sizing, Inc., Pittsboro, NC (US)

( * ) Notice: Subject to any disclaimer, the term of this patent is extended or adjusted under 35 U.S.C. 154(b) by 243 days.

This patent is subject to a terminal disclaimer.

(21) Appl. No.: 18/820,195

(22) Filed: Aug. 29, 2024

(65) Prior Publication Data

US 2024/0416358 A1 Dec. 19, 2024

Related U.S. Application Data

(63) Continuation of application No. 17/784,245, filed as application No. PCT/US2020/064236 on Dec. 10, 2020, now Pat. No. 12,103,011.

(60) Provisional application No. 62/946,153, filed on Dec. 10, 2019.

(51) Int. Cl.

| | |
|---|---|
| ***B02C 25/00*** | (2006.01) |
| ***B02C 18/16*** | (2006.01) |
| ***B02C 18/22*** | (2006.01) |

(52) U.S. Cl.

CPC .......... *B02C 25/00* (2013.01); *B02C 18/2258* (2013.01); *B02C 18/2291* (2013.01); *B02C 2018/164* (2013.01)

(58) Field of Classification Search

CPC . B02C 18/2258; B02C 18/2291; B02C 23/02; B02C 23/04; B02C 23/08

See application file for complete search history.

(56) References Cited

U.S. PATENT DOCUMENTS 4,084,753 A * 4/1978 Fruh .................... B02C 13/288 241/34
4,512,521 A * 4/1985 Johanning ............ B02C 13/288 241/34
5,407,138 A * 4/1995 Graenicher ............ G01N 33/10 241/6
6,199,780 B1 * 3/2001 Gorlitz .................. B30B 11/245 241/23
6,295,794 B1 * 10/2001 Nordt ...................... E04F 13/04 141/94

(Continued)

*Primary Examiner* — Bobby Yeonjin Kim

(74) *Attorney, Agent, or Firm* — Michael E. Dukes; Dentons Cohen & Grigsby, P.C.

(57) ABSTRACT

A milling system to comminute a material may generally include a hopper feeder system, a cutting mill, a collection system, each in fluid communication to provide a flow path, and a control system. The control system may include a controller operatively connected to at least one sensor to sense the amount of material, if any, along the flow path, and the speed, if any, of the material along the flow path. The control system, in response to signals received from the at least one sensor, may cause at least one of the hopper feeder, cutting mill, and collection system to increase the speed, decrease the speed, or stop the flow of material along at least a portion of the flow path. Methods of making and using the same are also described.

13 Claims, 19 Drawing Sheets

(56) References Cited

U.S. PATENT DOCUMENTS

| | | | | |
|---|---|---|---|---|
| 6,464,082 | B1 * | 10/2002 | Kimmel | B07C 5/3427 241/24.22 |
| 2004/0094641 | A1 * | 5/2004 | Chen | B03C 1/20 241/23 |
| 2009/0283018 | A1 * | 11/2009 | Grasso, Jr. | B02C 21/00 241/99 |
| 2016/0214115 | A1 * | 7/2016 | Bauer | B02C 25/00 |

* cited by examiner

MILLING SYSTEM

CROSS REFERENCE TO RELATED APPLICATION

This application is a continuation of U.S. Ser. No. 17/784,245, filed on Jun. 10, 2022, which is a U.S. national stage entry under 35 U.S.C. § 371 of International Application No. PCT/US2020/064236, filed on Dec. 10, 2020, which claims the benefit of and priority to U.S. Provisional Application No. 62/946,153, filed on Dec. 10, 2019, the entire contents of each of which are incorporated herein by reference.

FIELD OF INVENTION

This disclosure generally relates to a milling system, and in particular a milling system comprising a mill and a controller, as well as methods of making and using the same.

BACKGROUND

A mill is a device used to break solid materials into smaller pieces by grinding, crushing, or cutting. The comminution of solid materials may occur through mechanical forces that break up the structure of the material by overcoming the interior bonding forces. The mill may be used in laboratories to reduce the size of soft, medium-hard, fibrous and/or tough materials. The mill may comprise a rotor that revolves at high speed to comminute the solid material. The rotor may comprise cutting plates to comminute the material. The geometry of the rotor may be configured for specific material properties, such as medium-hard, soft, fibrous or elastic materials. The mill may also separate, size, or classify the smaller pieces of the material. The smaller pieces of the material may be characterized by grain size, grain shape, and grain size disposition, for example.

DESCRIPTION OF THE DRAWINGS

The devices and processes described herein may be better understood by considering the following description in conjunction with the accompanying drawings; it being understood that this disclosure is not limited to the accompanying drawings.

DETAILED DESCRIPTION

Figure 1:
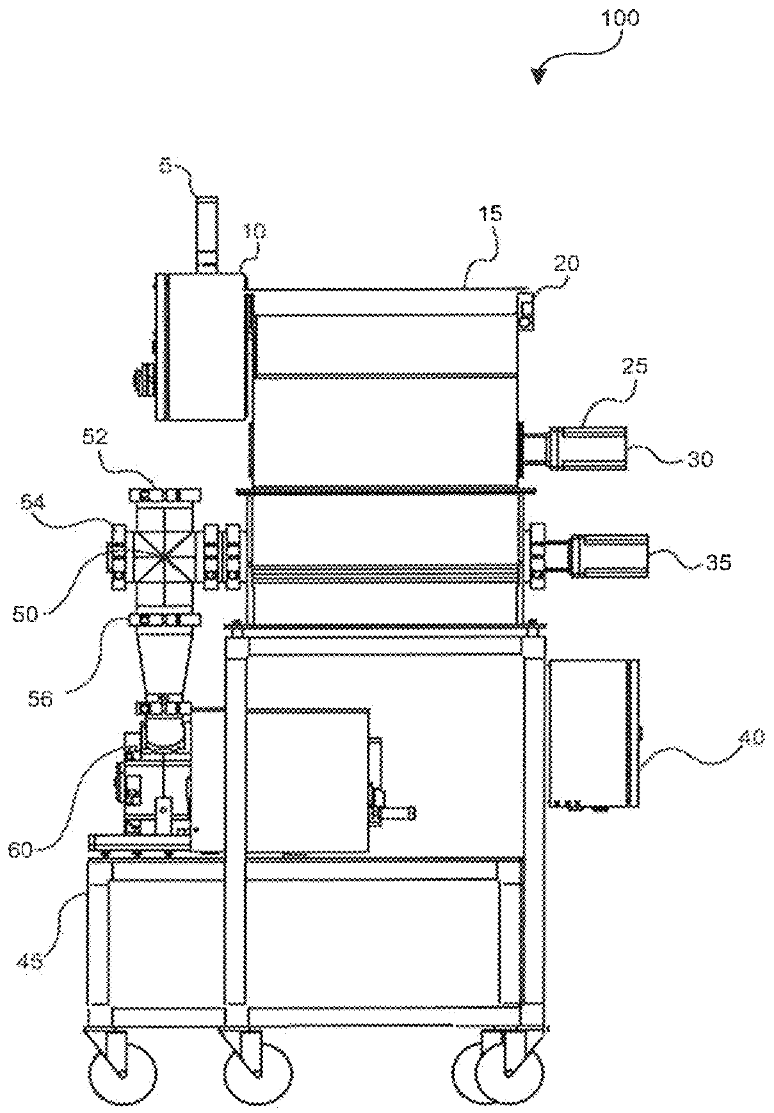
FIGS. 1 and 2A-D illustrate a milling system comprising a volumetric hopper feeder according to the present invention.
Figure 2A:
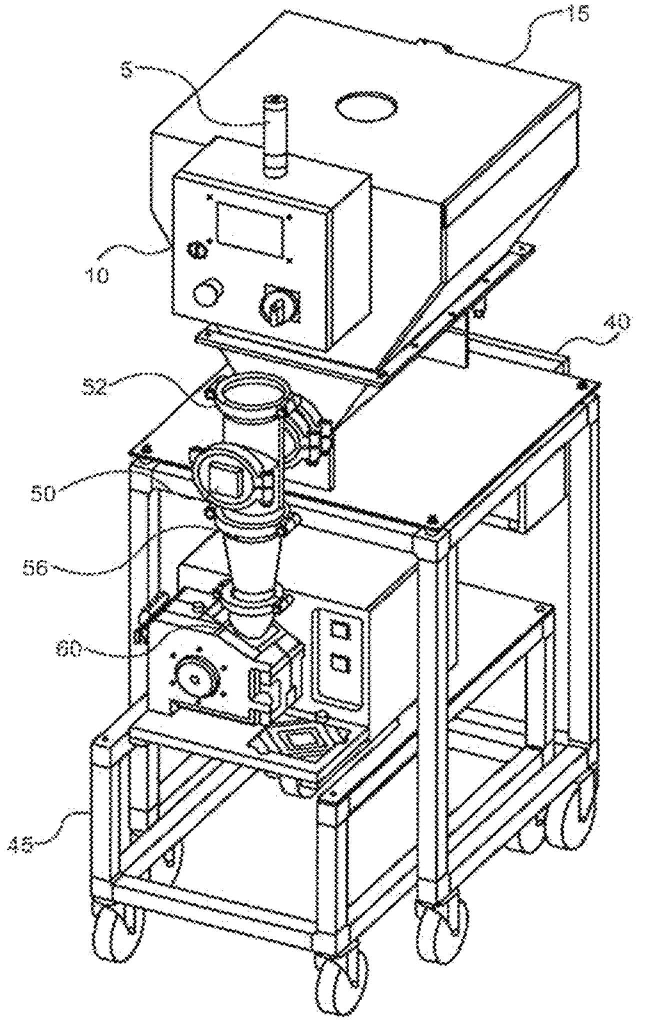
Figure 2B:
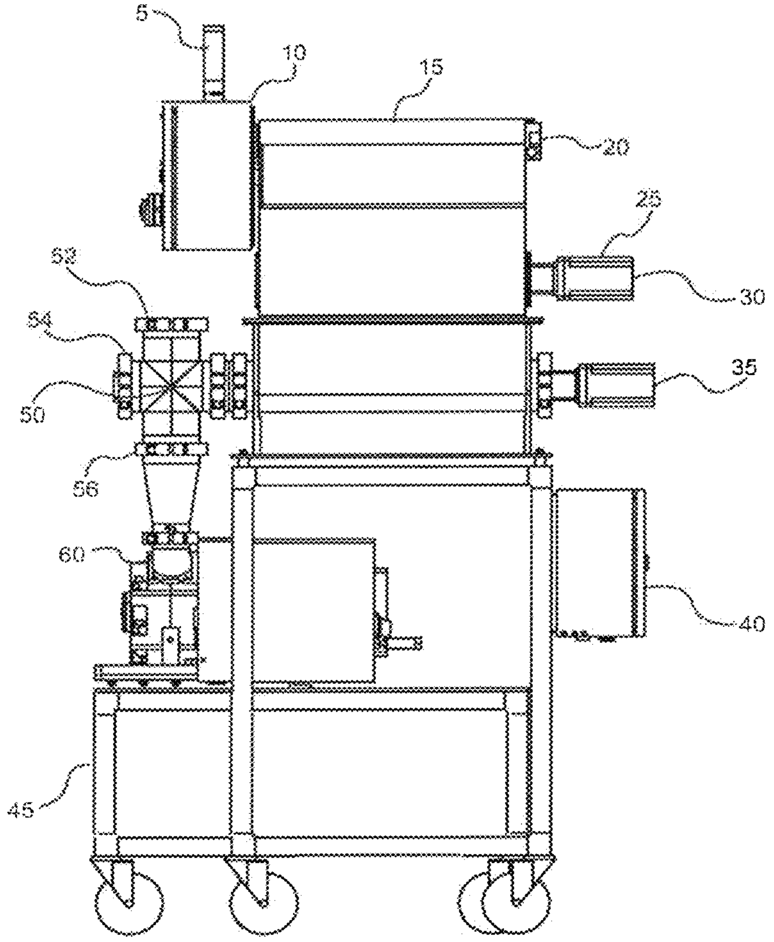
Figure 2C:
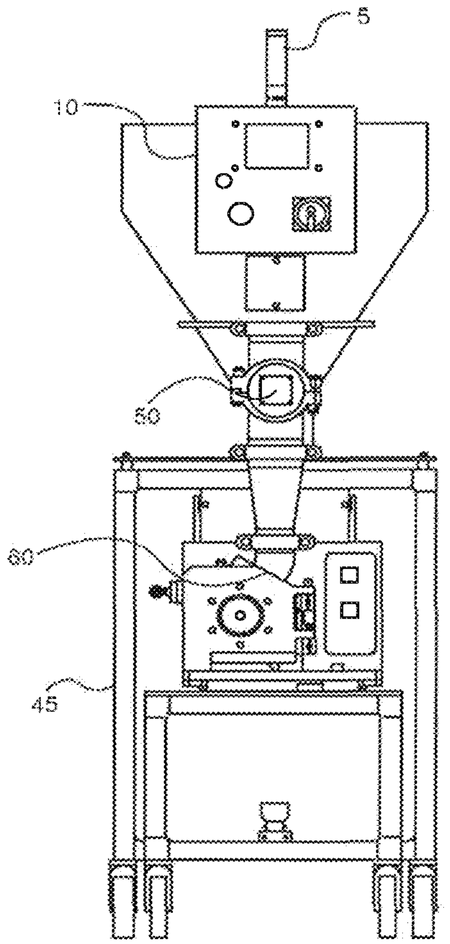
Figure 2D:
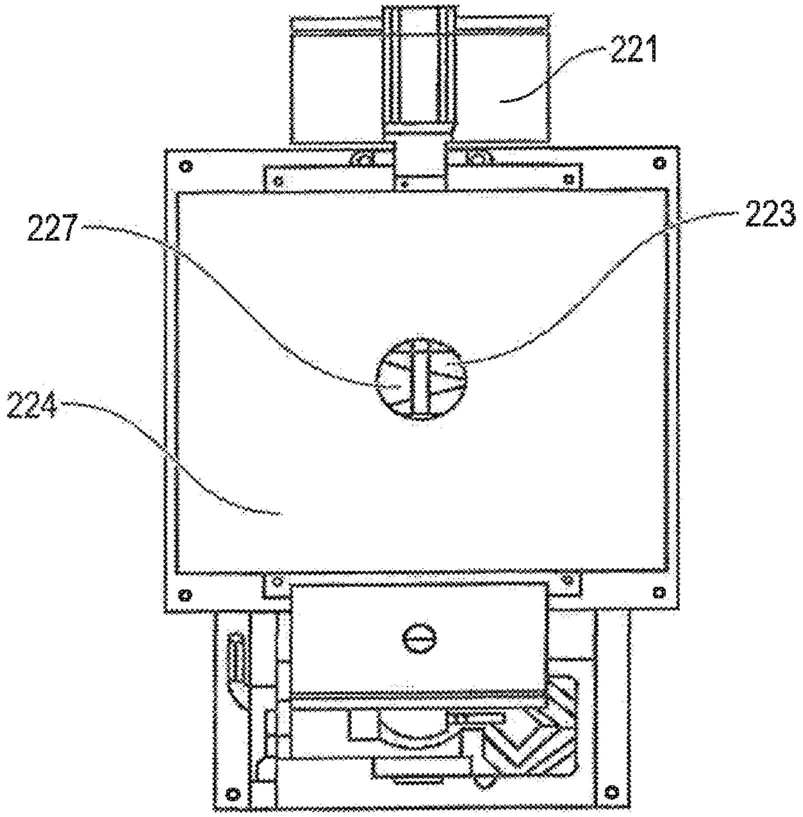
Figure 3A:
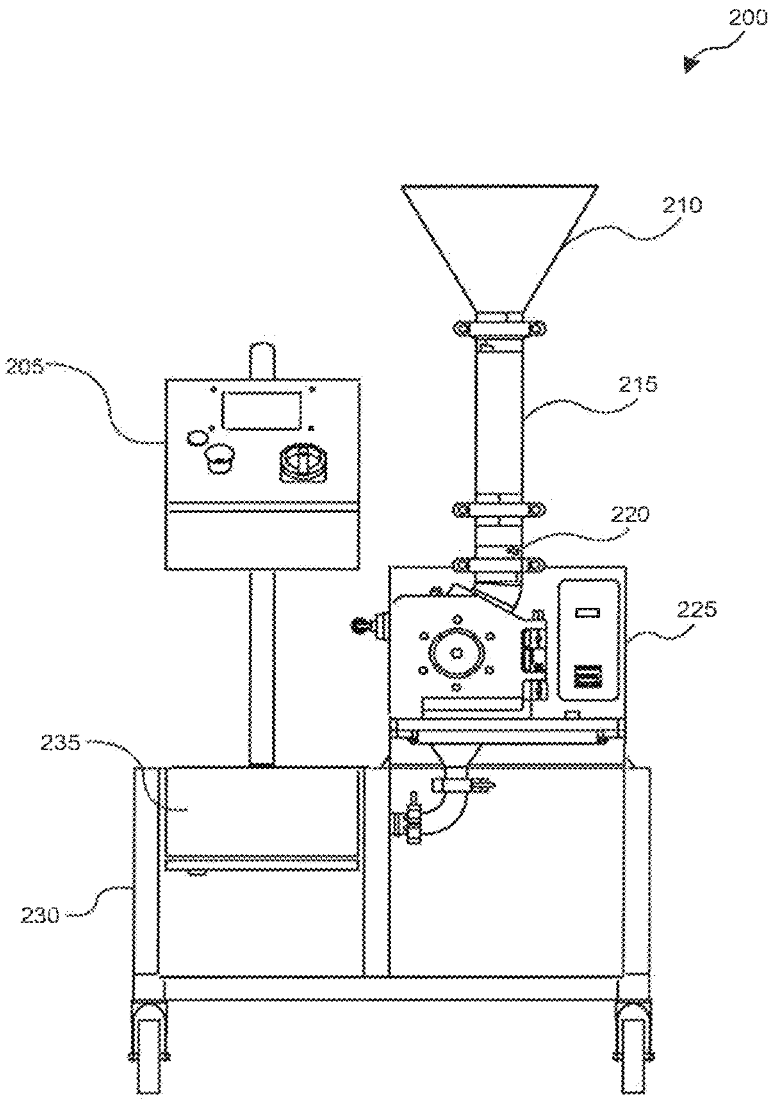
FIGS. 3A-D, 8 and 9 illustrate a milling system comprising a standalone milling system according to the present invention.
Figure 3B:
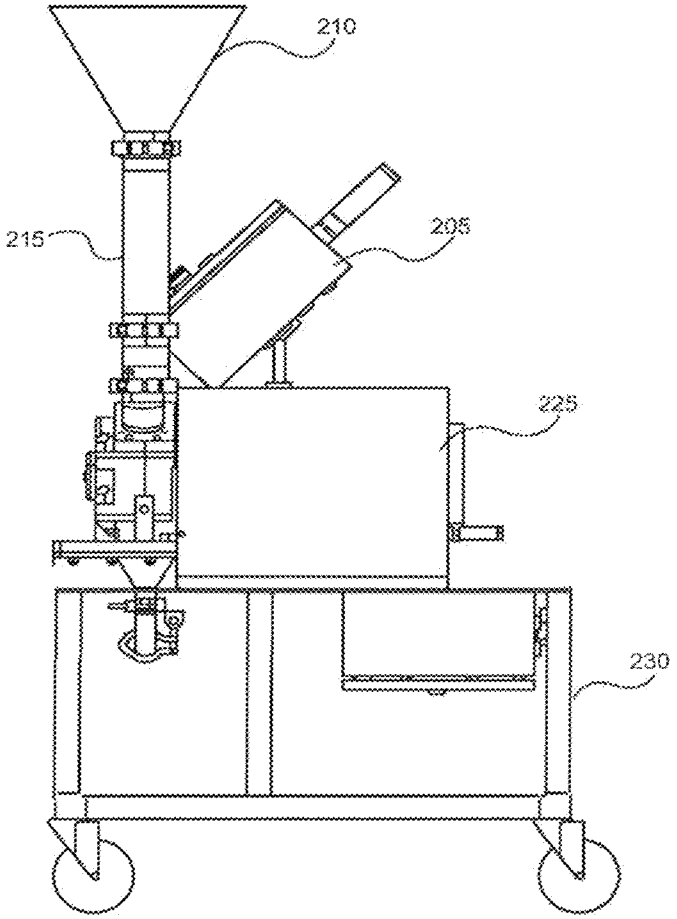
Figure 3C:
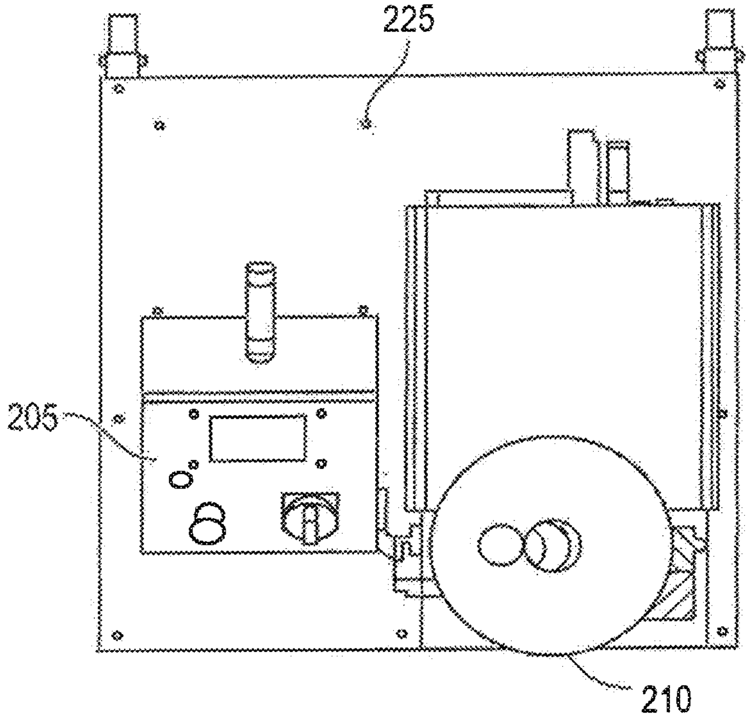
Figure 3D:
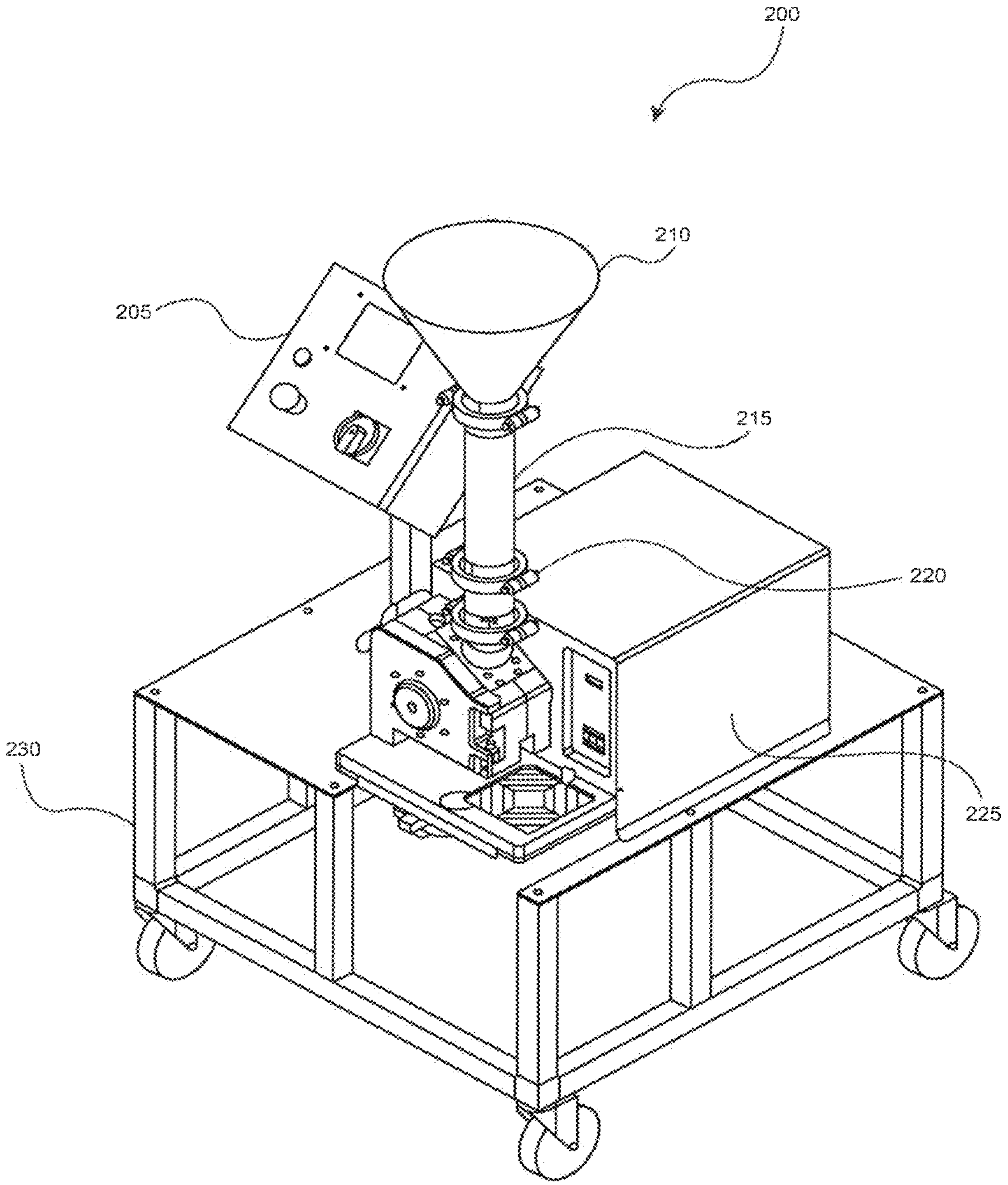
Figure 4:
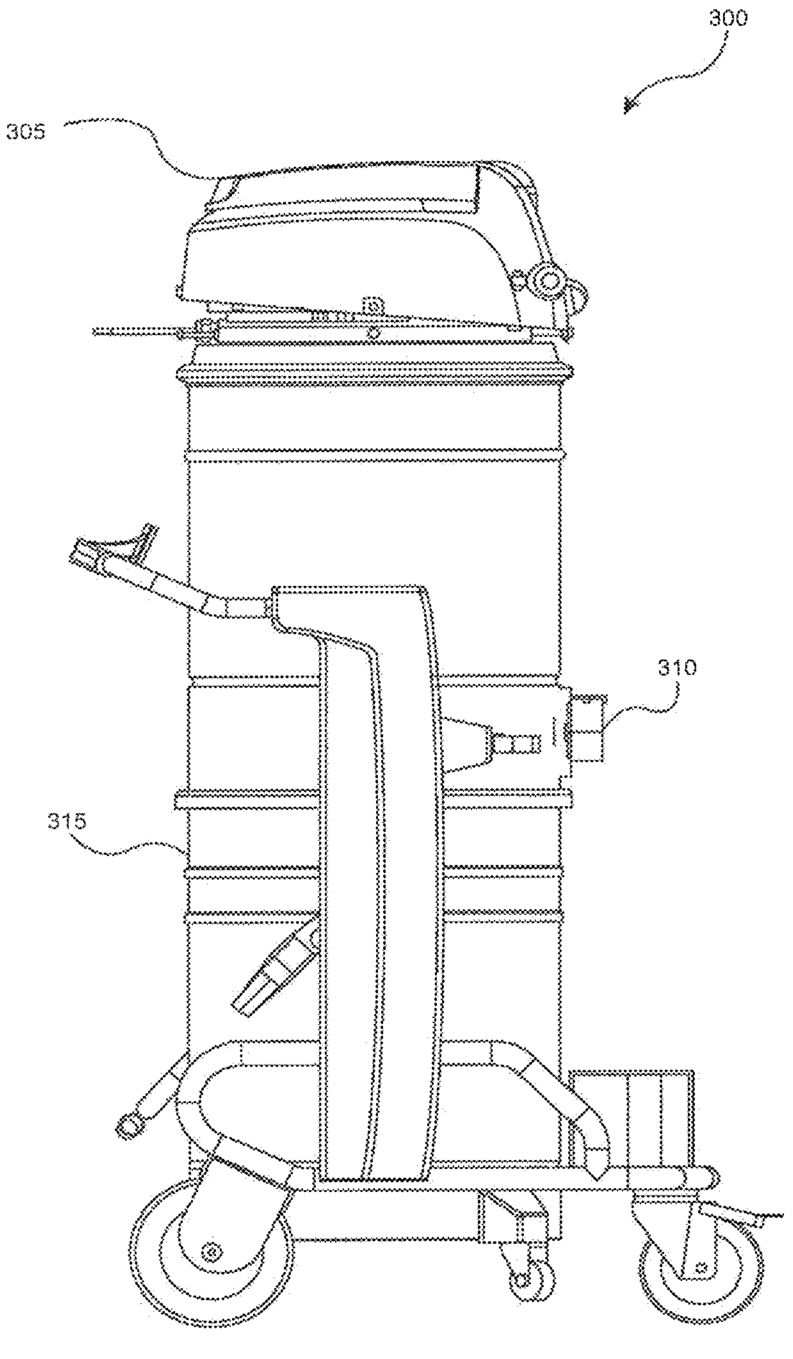
FIGS. 4, 5, and 10-12 illustrate collection systems for the milling systems according to the present invention.

This disclosure generally describes milling systems as well as methods of making and using the same. It is understood, however, that this disclosure also embraces numerous alternative features, aspects, and advantages that may be accomplished by combining any of the various features, aspects, and/or advantages described herein in any combination or sub-combination that one of ordinary skill in the art may find useful. Such combinations or sub-combinations are intended to be included within the scope of this disclosure. As such, the claims may be amended to recite any features, aspects, and advantages expressly or inherently described in, or otherwise expressly or inherently supported by, this disclosure. Further, any features, aspects, and advantages that may be present in the prior art may be affirmatively disclaimed. Accordingly, this disclosure may comprise, consist of, consist essentially or be characterized by one or more of the features, aspects, and advantages described herein. As used herein, the term "and/or" includes any and all combinations of one or more of the associated listed items.

All numerical quantities stated herein are approximate, unless stated otherwise. Accordingly, the term "about" may be inferred when not expressly stated. The numerical quantities disclosed herein are to be understood as not being strictly limited to the exact numerical values recited. Instead, unless stated otherwise, each numerical value stated herein is intended to mean both the recited value and a functionally equivalent range surrounding that value. At the very least, and not as an attempt to limit the application of the doctrine of equivalents to the scope of the claims, each numerical value should at least be construed in light of the number of reported significant digits and by applying ordinary rounding processes. Typical exemplary degrees of error may be within 20%, 10%, or 5% of a given value or range of values. Alternatively, and particularly in biological systems, the term "about" refers to values within an order of magnitude, potentially within 5-fold or 2-fold of a given value. Notwithstanding the approximations of numerical quantities stated herein, the numerical quantities described in specific examples of actual measured values are reported as precisely as possible. Any numerical values, however, inherently contain certain errors necessarily resulting from the standard deviation found in their respective testing measurements.

All numerical ranges stated herein include all sub-ranges subsumed therein. For example, a range of "1 to 10" or "1-10" is intended to include all sub-ranges between and including the recited minimum value of 1 and the recited maximum value of 10 because the disclosed numerical ranges are continuous and include every value between the minimum and maximum values. Any maximum numerical limitation recited herein is intended to include all lower numerical limitations. Any minimum numerical limitation recited herein is intended to include all higher numerical limitations.

In the following description, certain details are set forth in order to provide a better understanding of various features, aspects, and advantages the invention. However, one skilled in the art will understand that these features, aspects, and advantages may be practiced without these details. In other instances, well-known structures, methods, and/or processes associated with methods of practicing the various features, aspects, and advantages may not be shown or described in detail to avoid unnecessarily obscuring descriptions of other details of the invention.

The terminology used herein is for the purpose of describing particular examples only and is not intended to be limiting. As used herein, the singular forms "a", "an", and "the" may be intended to include the plural forms as well, unless the context clearly indicates otherwise. The terms "comprises", "comprising", "including", "having", and "characterized by", are inclusive and therefore specify the presence of stated features, elements, compositions, steps, integers, operations, and/or components, but do not preclude the presence or addition of one or more other features, integers, steps, operations, elements, components, and/or groups thereof. Although these open-ended terms are to be understood as a non-restrictive term used to describe and claim various aspects set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, described herein also specifically includes embodiments consisting of, or consisting essentially of, such recited compositions, materials, components, elements, features, integers, operations, and/or process steps. In the case of "consisting of", the alternative embodiment excludes any additional compositions, materials, components, elements, features, integers, operations, and/or process steps, while in the case of "consisting essentially of", any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

A milling system according to the present invention may comprise a hopper feeder, a mill, a cyclone separator, a collection container, and a vacuum source.

A milling system according to the present invention may comprise a hopper feeder, a mill, a cyclone separator, a collection container, a vacuum source, and a control system.

A milling system according to the present invention may comprise a volumetric hopper feeder, a mill, a collection system, and a control system.

A milling system according to the present invention may comprise a standalone milling system, a mill, a collection system, and a control system.

A milling system according to the present invention may comprise a feeding system, temperature sensors, laser sensors, weight scales, conveying devices (both towards and away from the hopper feeder, cutting mill, and collection system), touch screen operator interface, automated controller, operator light stack indicators, moisture measurement instrumentation, air flow sensors.

The control system for the milling system according to the present invention may be operatively connected to the weight sensor, laser sensor, temperature sensor, air flow sensor, and user interface to adjust and/or set the prespecified parameters. The controller may be configured to control the agitation and feeding rates in relation to the cutting mill speed as well as the amount of material in the collection container.

A method of milling a material, the method comprising: feeding the material into a hopper system to mix, blend, pre-mill, and/or pre-chill the material in the hopper; conveying the material using motor drive systems, augers, agitators, vibration, and/or airflow, either continuously or in intervals, to a grinder to reduce the size of the material to a desired size; optionally, (pneumatically) conveying the material to a remote location; and collecting the material in a collection container.

A method of milling a material, the method comprising: feeding the materials into a top inlet of a hopper; mixing the material in the hopper; dispensing the mixed material from an outlet of the hopper into an export channel; dispensing the mixed material from the export channel via gravity and/or air/vacuum assisted flow into an inlet of a mill; milling the mixed material using precision cutting rotors and/or fixed knives in a cutting chamber of the mill to reduce the mixed material to a prespecified size (e.g., particle size, such as average particle size) based on at least one of the following adjustable parameters: cutting speed (RPM), gap settings, sieve cassette size, feeding rate (i.e., flow rate) and collection system and method; and dispensing the cut material from the cutting chamber through a carrier tube and/or channel to a collection system comprising one of a cyclone/collection container and an all in one-collection vacuum system lacking the cyclone.

A method of milling a material comprising, when the controller senses any material not moving (e.g., a flow rate of zero or less than a prespecified flow rate) through certain areas of the system (e.g., the hopper feeder, the mill, and/or the flow path therebetween) for a prespecified period of time (e.g., 1-60 seconds, at least 5, 10, 15, 20, 25, or 30 seconds, 1-30 minutes, at least 1, 2, 3, 4, 5, 7, or 10 minutes), shutting down the system in order of operation (i.e., reducing the flow rate to zero and/or deactivating the drive assemblies for the conveyor, hopper feeder, cutting mill, and/or collection system in order from the inlet to the outlet along the flow path) as indicated by at least one of the controller and user specification.

A milling system comprising a controller, wherein the milling system is characterized by at least one of, processing of bulk feeding/grinding of materials in an automated, process that reduces manual operation and irregular feeding by hand, controls dust, product loss, protects users, maintains integrity/quality of product and increases throughput of overall material by time relative to a mill lacking the controller.

A milling system comprising a controller, the milling system characterized by more efficient use and mitigation of down time to check processes (e.g., material feeding, material flow, and filling levels (e.g., pre-grinding and post-grinding) relative to a mill lacking the controller.

A controller according to the present invention may be configured to control at least one of: a mixing device (e.g., a feeding auger, a grind auger, and an agitator) in the hopper feeder; a milling/grinding system in the cutting mill (e.g., a cutting rotor, fixed knives, and/or sieve cassettes); a vacuum/cyclone system in the collection system (e.g., the pressure or vacuum generated by the vacuum source in a least a portion the flow path); and a feeding hardware/system to transfer the material to the hopper feeder, collection container, and/or subsequent processing of the milled material (e.g., activating the drive assemblies for one or more conveyors/vacuum sources).

A control system comprising a controller comprising at least one sensor to identify a variable parameter and turn on/off/adjust system components, either individually or in combination, accordingly, wherein the variable parameter comprises at least one of low flow rate, no flow rate, an obstruction in the flow path, a fill height/weight of the material in the hopper feeder container less than a prespecified amount; a fill height/weight of the material in the collection container greater than a prespecified amount, and vacuum power/load.

A controller configured to control at least one of: the speed, strength, and/or activation time of hopper feeder (e.g., the feeding auger, grind auger, agitator, mixer, blender, pre-chiller and/or pre-milling device of the hopper feeder) to control the amount of material transferred to the cutting mill; the feeding mechanism (e.g., gravity, pressure or air flow, fluid flow) into the cutting mill; and the load/blockage actions of the controller for a specified time and/or volume/weight of material based on at least one of the measured parameters by the sensors and/or power feedback.

A controller to control the cutting mill parameters based on the data received from the one or more sensors, including revolution per minute of the mill, for example, 50-3000 RMP; on/off power of the mill; feeding rate of the mill; time for loading the material, time for processing the material, flow rate of the material, blockage by time/volume as detected by sensors position at inlet and/or outlet ports of the cutting mill.

A controller to control the vacuum and/or cyclone collection of the material based on the data received from the one or more sensors, including: on/off/power load adjustment; material flow rate/flow/blockage/filling levels (e.g., amount, weight, and/or volume); moisture contact of the material.

The controller may comprise a display having to display operational features and settings, the display may comprise: red/green indicators related to on/off, respectively; numbers/text; visual renderings of any of the components/operations described herein with indicators; and light stack with green/yellow/red indicators for flow rate and blockage (i.e., progress or stoppage).

The controller may comprise an emergency stop to stop operation (i.e., deactivate the drive assembly for at least one of the components of the milling system) and/or cut power to the milling system.

The milling system may comprise an inlet port in fluid communication with an outlet port. The conveyor connected to (i.e., in fluid communication with) the hopper feeder may comprise the inlet. The hopper feeder may comprise the inlet. The hopper feeder may be in fluid communication with the mill. The mill may be in fluid communication with the collection system. For example, the mill may be in fluid communication with the cyclone separator, and the cyclone separator may be in fluid communication with the collection container. The material may flow through the milling system via vacuum provided by the vacuum source. The vacuum source may be in fluid communication with the conveyor and/or hopper feeder.

The milling system may comprise a photoelectric sensor to detect the input feed of the material into the cutting mill. The controller may activate the cutting blade when material is detected in the input feed of the cutting mill. The milling system may comprise a weight/volume sensor to detect the weight/volume of material dispensed from the outlet of the cutting milling into a collection container. The volume sensor may measure the height/weight of material deposited into the collection container. The collection container may comprise a cyclone separator. The controller may deactivate the cutting blade and/or vacuum when the amount of material in the collection container achieves a prespecified amount.

A milling system according to the present invention may comprise a hopper feeder, a mill, a cyclone separator, a collection container, a vacuum source, a frame/stand having at least one mounting plate, and a control system configured to control the milling system. The milling system may comprise a conveyor and corresponding drive motor to transfer material to the hopper feeder. The hopper feeder may comprise at least one of a feeding auger, a grind auger, and an agitator having corresponding drive motors to transfer material to the mill. The milling system may comprise a feeding attachment in communication with the hopper feeder and/or mill, such as a tube in fluid communication with the hopper feeder and/or mill. The mill may comprise a cutting rotor, fixed knives, and/or sieve cassettes having corresponding drive motors to comminute the material. The milling system may comprise a collection container to collect the milled material. The milling system may comprise a feeding attachment in communication with the mill and/or collection container, such as a tube in fluid communication with the mill and/or collection container. The vacuum source may generate a pressure along the flow path sufficient to transfer the material from the mill to the collection container and/or a vacuum sufficient for the cyclone separator to separate the milled material according to size and/or weight.

FIGS. 1 and 2 illustrate a milling system according to the present invention comprising a light stack indicator configured to indicated when the milling system is in use, not in use, or in an error state (e.g., blocked flow path, clogged mill, etc.); a display enclosure assembly comprising a stainless steel IP65 rated enclosure having a 5.7 inch touch screen for the user interface, and a safety emergency stop and power isolation switch mounted to the front door of the display enclosure for easier access from around the system; a hopper feeder lid assembly comprising a stainless steel lid to reduce/prevent access into the hopper when in use, an interlock key located on the lid for safety operation, and a containment of particulates from material agitation and feeding; a hopper lid safety interlock for system safety and configured to stop the auger and/or agitator when the lid is open and latch is disengaged; an agitator assembly comprising a tri-flight blade agitator having three blades in a helix form around the drive shaft; an agitator motor assembly configured to be used as a power drive to agitate the material in the hopper and reduce/prevent binding and distribute the material around the hopper to achieve improved flow of the material along the flow path; a variable flight auger having a length of 50-100 mm length and configured to stretch the material and discharge the material from the front of the hopper as a greater rate than from the rear such that the material is maintained at a prespecified height within the hopper to reduce/prevent overflow; an auger motor assembly configured to be used as a power drive for the auger to feed the material from the hopper to the cutting mill and controlled via a stepper drive or variable speed drive to motor characterized by a high torque rating and low and high speed for consistent flow of the material; a filtered air flow port comprising a sanitary gasket having 2 mm mesh to reduce access and protect airflow through the flow path; a direct connection cross assembly comprising a cross direct connection exit head configured such that the auger discharges material out of the hopper and into the airflow of the flow path in leading to the cutting mill; an input sensor assembly to monitor the flow of the material through the flow path, detect blockages along the flow path, and detect when the amount of the material in the hopper is less than a prespecified amount when the milling system is operating in its automated feeding process; a metal detection sensor to detect metal in the flow path and configured to send a signal to the controller to stop the flow of material and/or stop the mill to prevent the detected metal from damaging the mill; a large diameter input assembly having a diameter of 66 mm for receiving the material from the hopper and directly connected to the mill; a temperature sensor to monitor the temperature of the cutting chamber; a weight scale and indicator assembly having a capacitive sensor assembly to detect the amount/height of material in the collection container; a vacuum pressure sensor to monitor the pressure of the vacuum along the flow path to optimize the flow rate of material; and a controller assembly comprising an automated controller for integration of one or more components of the milling system, including the cutting mill, vacuum exhaust system, hopper sensors, external weight scale, agitator, auger power drives, display, and light stack indicator. The hopper feeder may comprise a vacuum feeder. The hopper feeder may comprise an automated hopper. The hopper feeder may comprise an agitator with variable speed and/or a flight auger with variable speed. The hopper feeder may comprise a 50 L volume capacity. The hopper feeder may be configured for high throughput, continuous processing of 0.5-10 kg or more of material per minute. The cutting mill may comprise a variable rotational speed of 300-3000 rpm, such as 50-700 rpm. The controller may comprise an embedded printed circuit board (PCB) having firmware to control peripheral functions of the milling system, such as the controlling the start/stop, speed (RPMs), error codes, motor speed, and motor temperature of the cutting mill, the start/stop, negative pressure monitor, and fill limit indication of the vacuum exhaust, product input detection, such as the laser sensor detection of material and/or fill height of material in the collection container, the weight scale, including the indication, monitor, and limit controls, the AC power control including RCD and MCB based AC power controls for AC ON/OFF; a drive power and control configured to control motor speed and direction of material along the flow path, to monitor speed and direction of the material along the flow path, to detect blockages along the flow path, and to reverse direction of the material along the flow path when a blockage is detected to minimize downtime and continue work flow. The milling system may be position on a removable and movable cutting mill cart configured for easy movement and access to the cutting mill from the hopper feeder frame for cleaning.

FIGS. 3 and 4A-D illustrate a milling system according to the present invention comprising a control display comprising a 5.7 inch LCD touch screen to indicate standard operating procedures for the material storage, parameter storage, a system pause function, and manual mode; a controller enclosure to control one or more of the components of the milling system, including the hopper feeder/mill (e.g., power, RPM, temperature, and fault), the vacuum exhaust system (e.g., ON/OFF, amount of material in the collection container), a weight scale (e.g., the amount of material in the collection container), and material selection and storage; a large diameter input funnel, a large diameter input funnel having an extended neck, a laser sensor detection for material blockage and metallic objects in the flow path, a cutting mill, and a vacuum exhaust system. The milling system may be positioned on the movable stainless steel sanitary welded stand.

Figure 5:
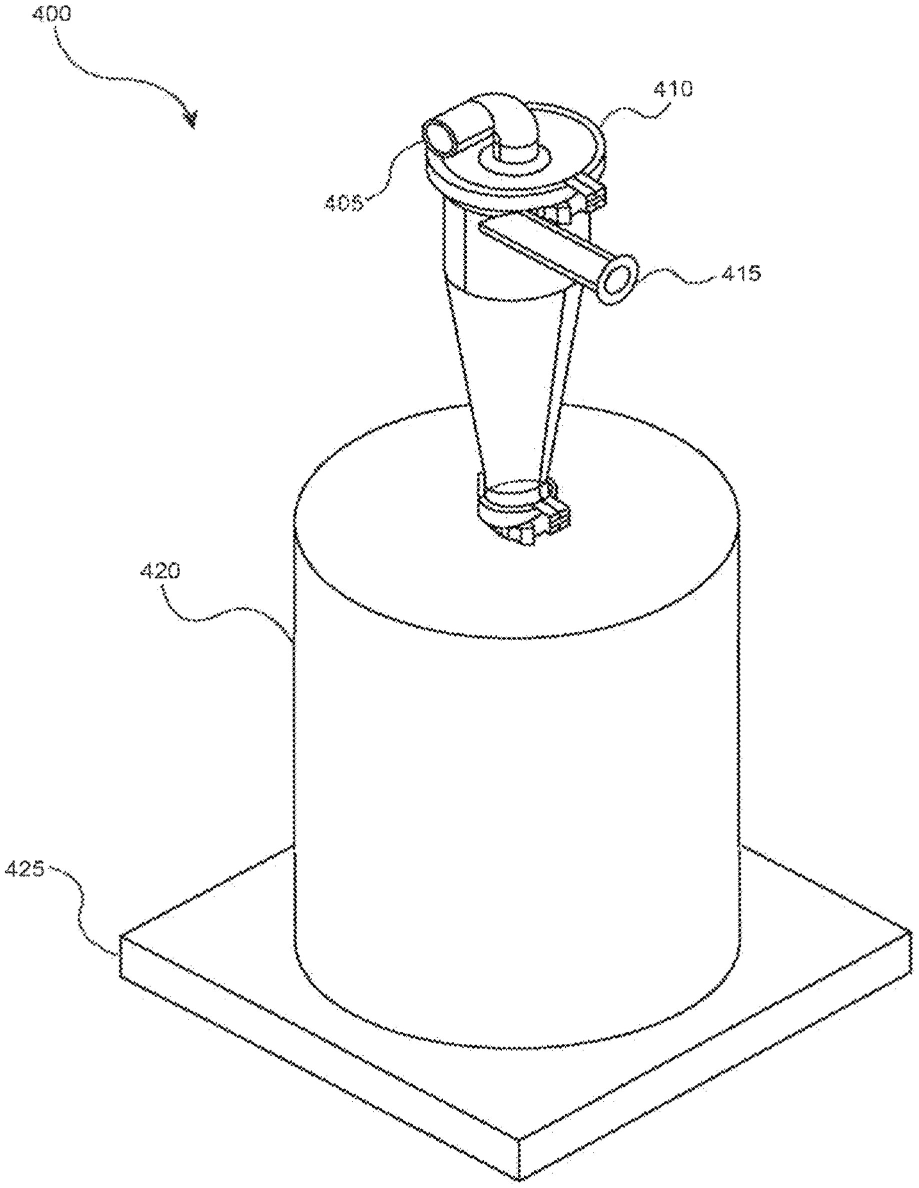

FIG. 5 illustrates a collection system according to the present invention comprising a cyclone separator having a material input and an vacuum output, a collection container, and a weight scale having an indicator.

Figure 6:
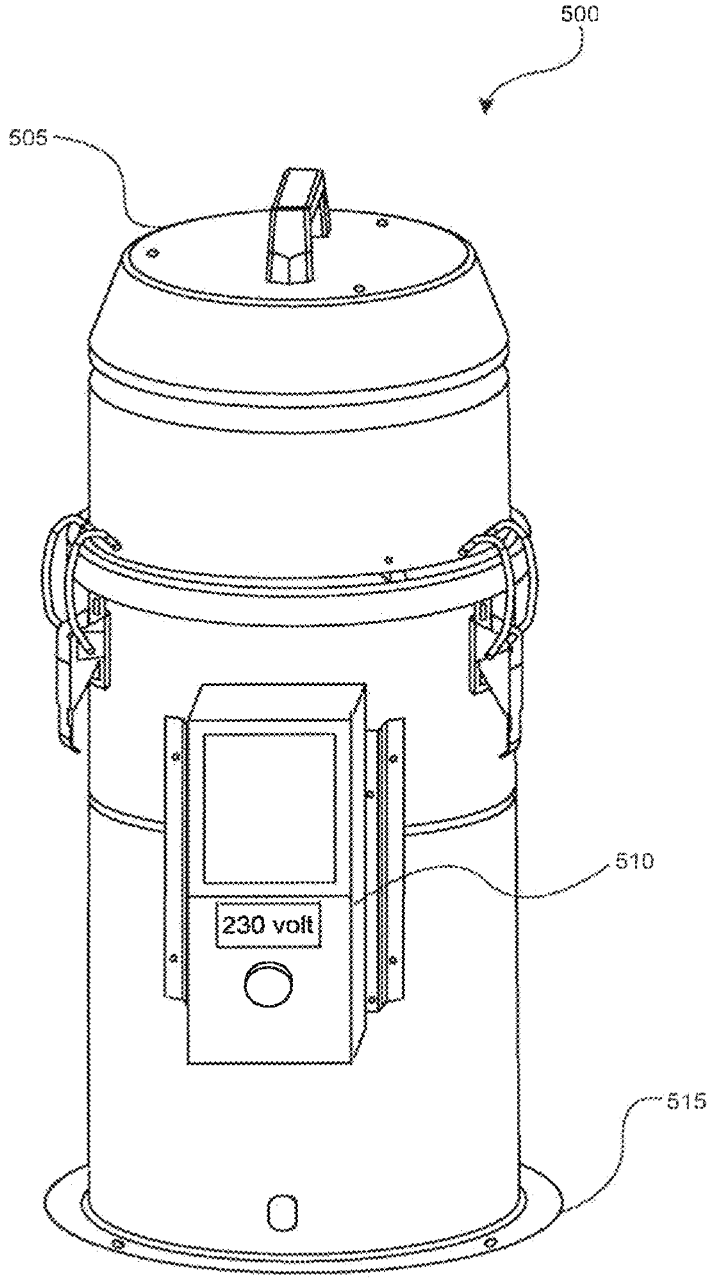
FIG. 6 illustrates a pneumatic conveyor for the milling systems according to the present invention.

FIG. 6 illustrates a collection system according to the present invention comprising an industrial vacuum having a 3 motor vacuum head and internal filter purge and an internal capacitive level sensor to sense the amount of material directly connected to the mill.

Figure 11:
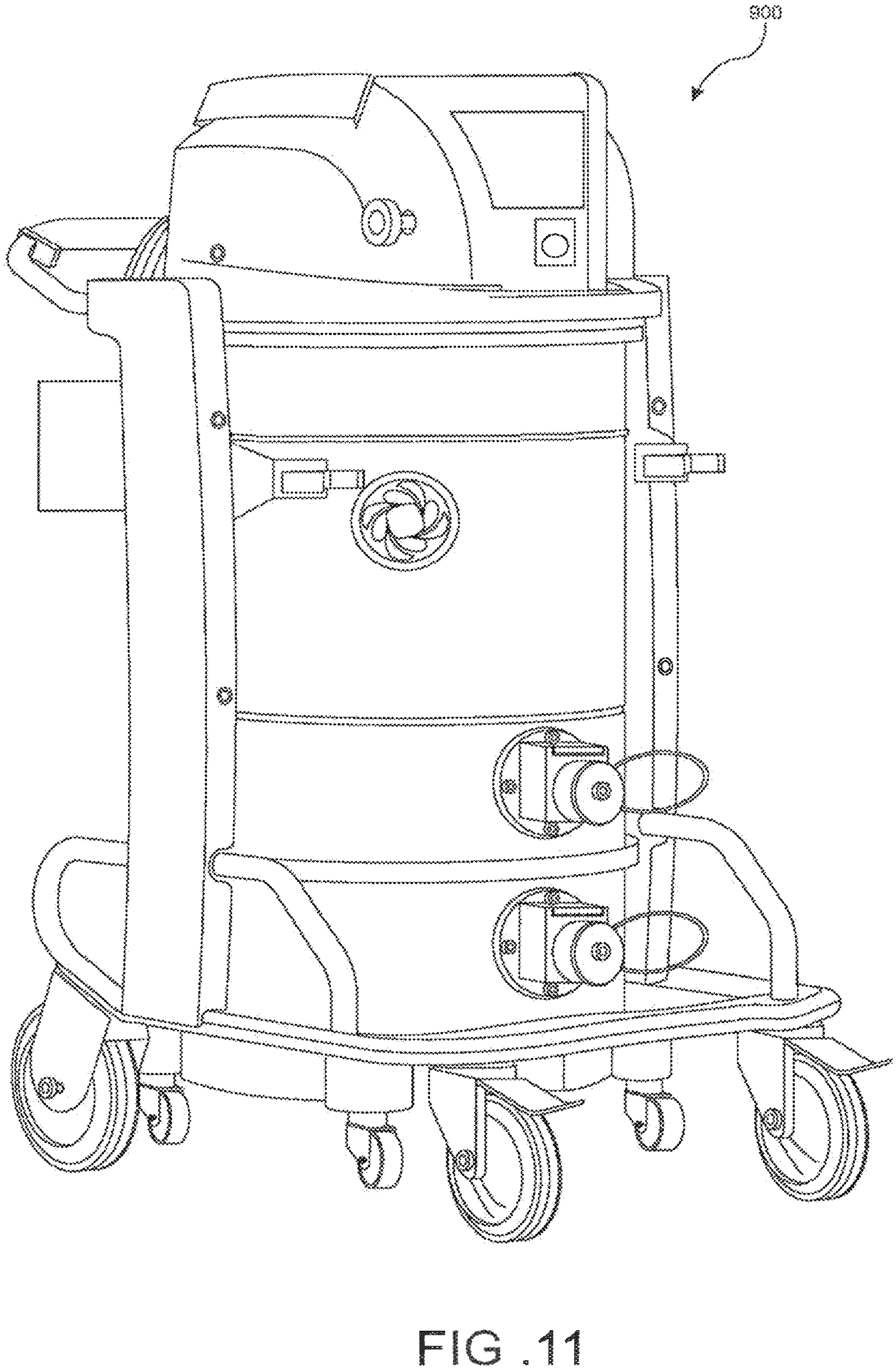

FIG. 11 illustrates a collection system according to the present invention comprising a double motor vacuum drum having direct power from a control unit. The collection system may be connected to (i.e., in fluid communication with) the cutting mill. The collection system may comprise an internal filter and a manual shaker.

Figure 12:
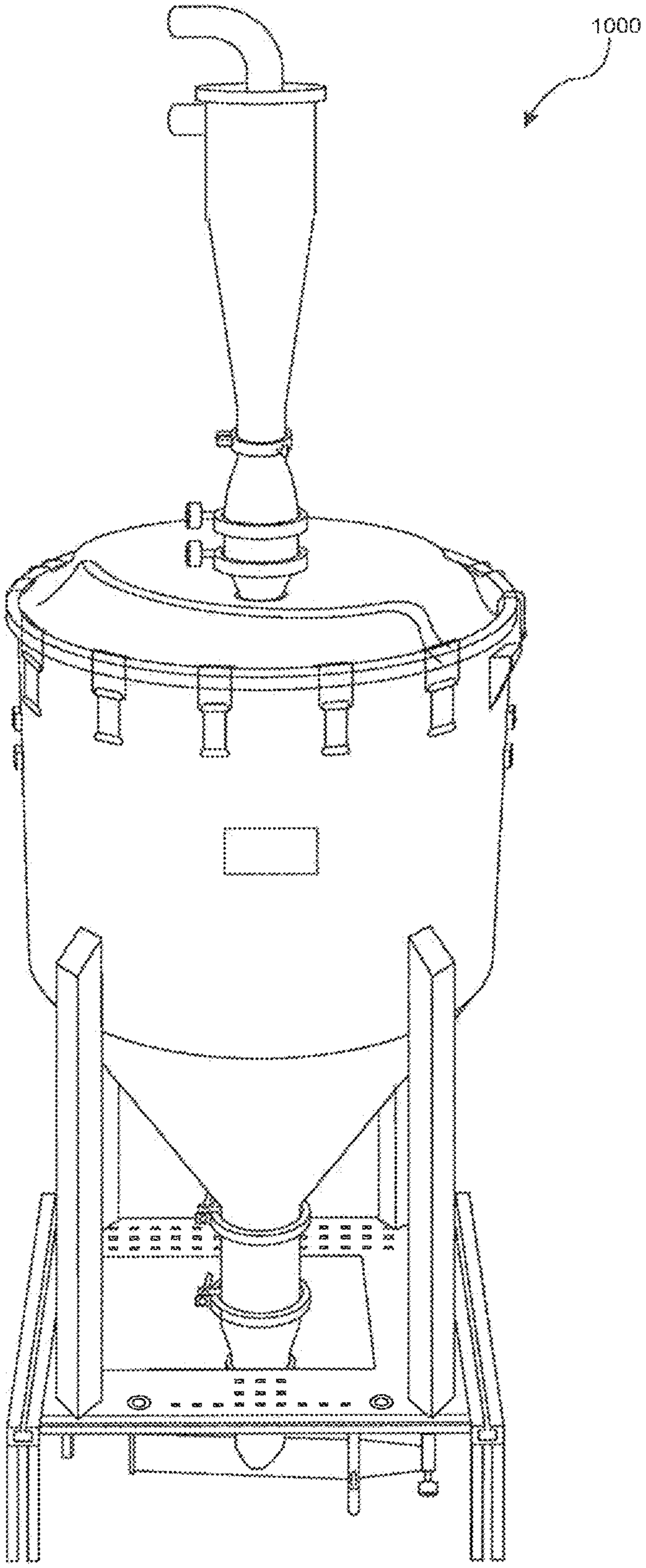

FIG. 12 illustrates a collection system according to the present invention comprising a motor assembly operatively connected to the controller and configured to receive the SOP for the material. The collection system may be connected to (i.e., in fluid communication with) the cutting mill. The collection system may comprise an internal filter and a manual shaker. The collection system may comprise a weight scale floor scale to sense the amount of material deposited into the collection container by the deviation of the weight of the collection system comprising the material and the weight of the collection system lacking the material. The collection system may comprise a capacitive sensor to sense the height of the material in the collection container to indicate when the height of the material in the collection container achieves a prespecified height.

Figure 13:
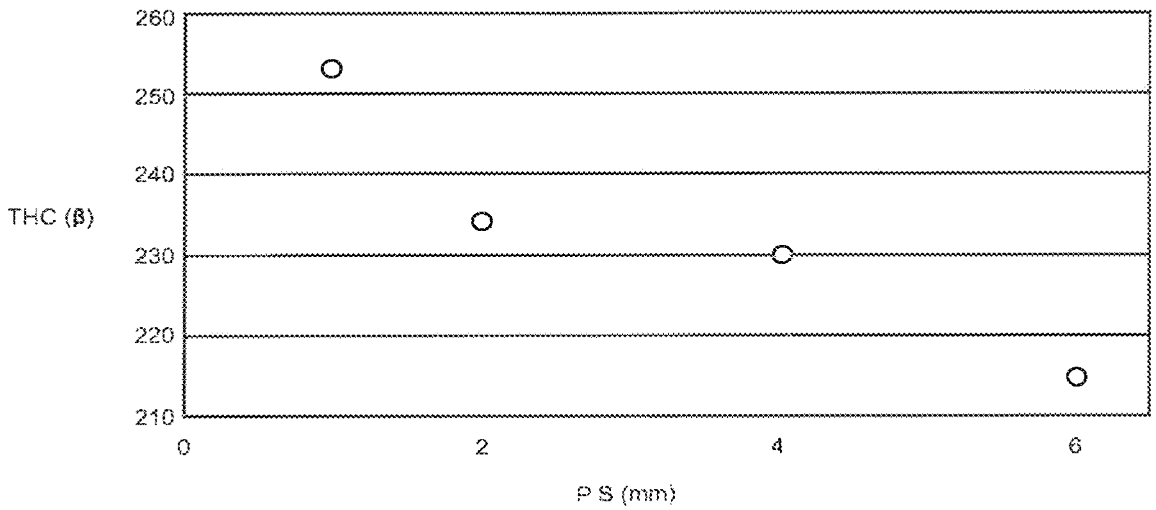
FIG. 13 shows the extraction efficiency for different particle sizes of the milling system according to the present invention for 2 kg material operating at a temperature of 34° C., a pressure if 124 bar, and a run time 6 h.

FIG. 13 illustrates a collection system according to the present invention comprising a cyclone separation exhaust collection connected to a large volume material collection container having a conical bottom. The collection system may comprise vibration shakers to cause the material to flow towards the collection container. The collection system may comprise one or more sensors to sense the moisture of the material, temperature of the material, and amount (e.g., by weight and/or height inside the collection container) of the material. The collection system may comprise a rotary valve to cause an airlock of the cyclone separation exhaust collection to cause the material to move into a separate airpath for material conveying. The rotary valve may be operatively connected to the controller to cause the material to flow to an external device for further processing instead of being collected in the collection container. The collection container may comprise sanitary connections (e.g., tubes) to transfer the material to the external device.

Figure 7:
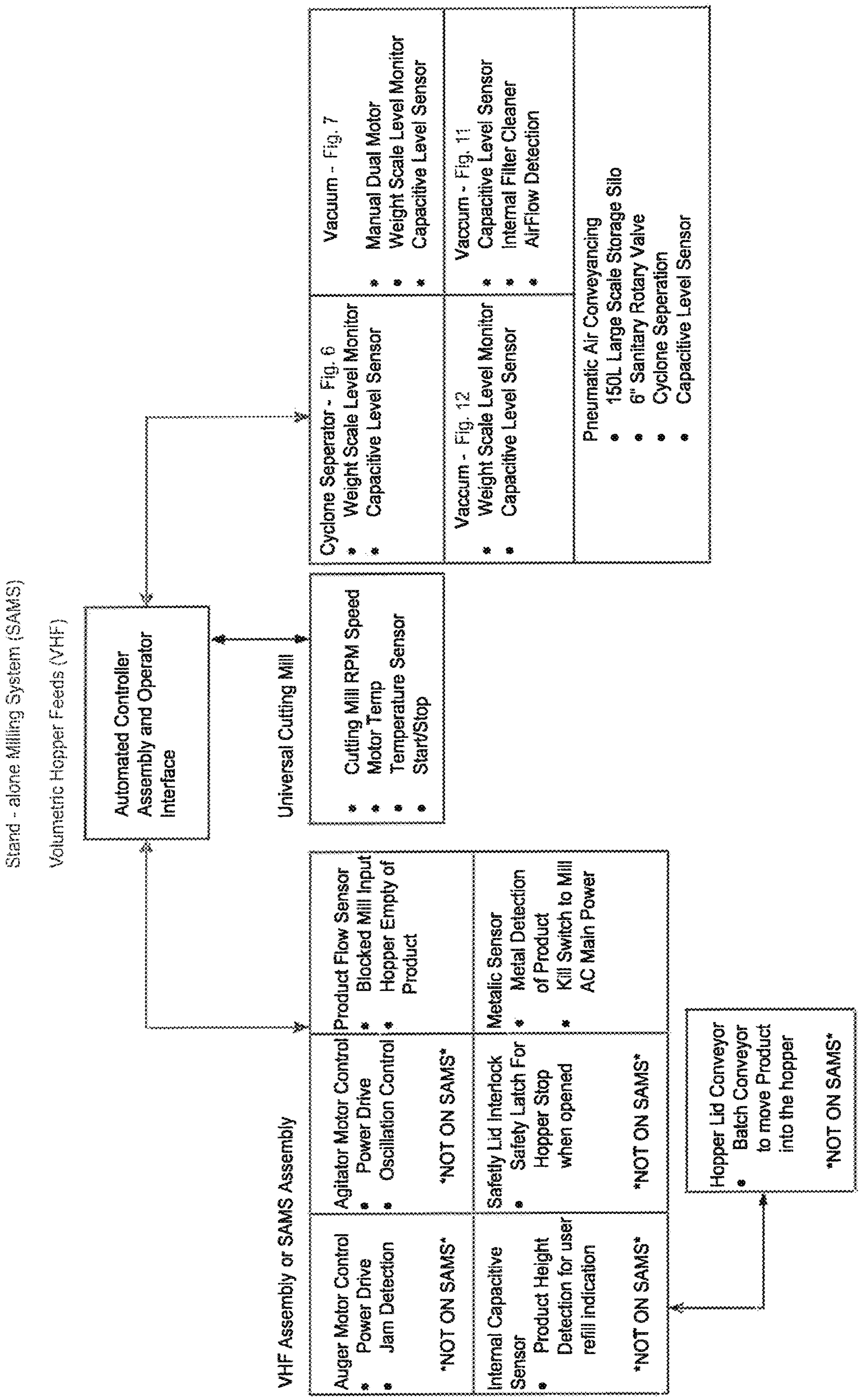
FIG. 7 illustrates flow charts for methods of milling a material according to the present invention.

FIG. 7 illustrates a pneumatic conveyor connected to the hopper feeder according the present invention comprising a vacuum power head and a controller configured to provide material to the hopper feeder when the amount of the material in the hopper feeder is less than a prespecified amount and stop providing material to the hopper feeder when the amount of the material in the hopper feeder is equal to or greater than a prespecified amount.

The milling system may comprise at least one sensor. The control system may comprise the sensor. The sensor may measure at least one characteristic of the material. The sensor may be in communication with the controller and generate a signal to the controller when the characteristic of the material achieves a desired threshold. The at least one sensor may measure and/or communicate to the controller the weight of material in the collection container, the volume of the material in the collection container, the flow rate of the material through the milling system, the temperature of the drive motors, the RPM of the feeding auger, grind auger, and/or agitator of the hopper. The characteristics of the material may also include feed size and volume of the sample, grinding time and desired final particle size, any abrasion of the grinding parts.

Figure 8:
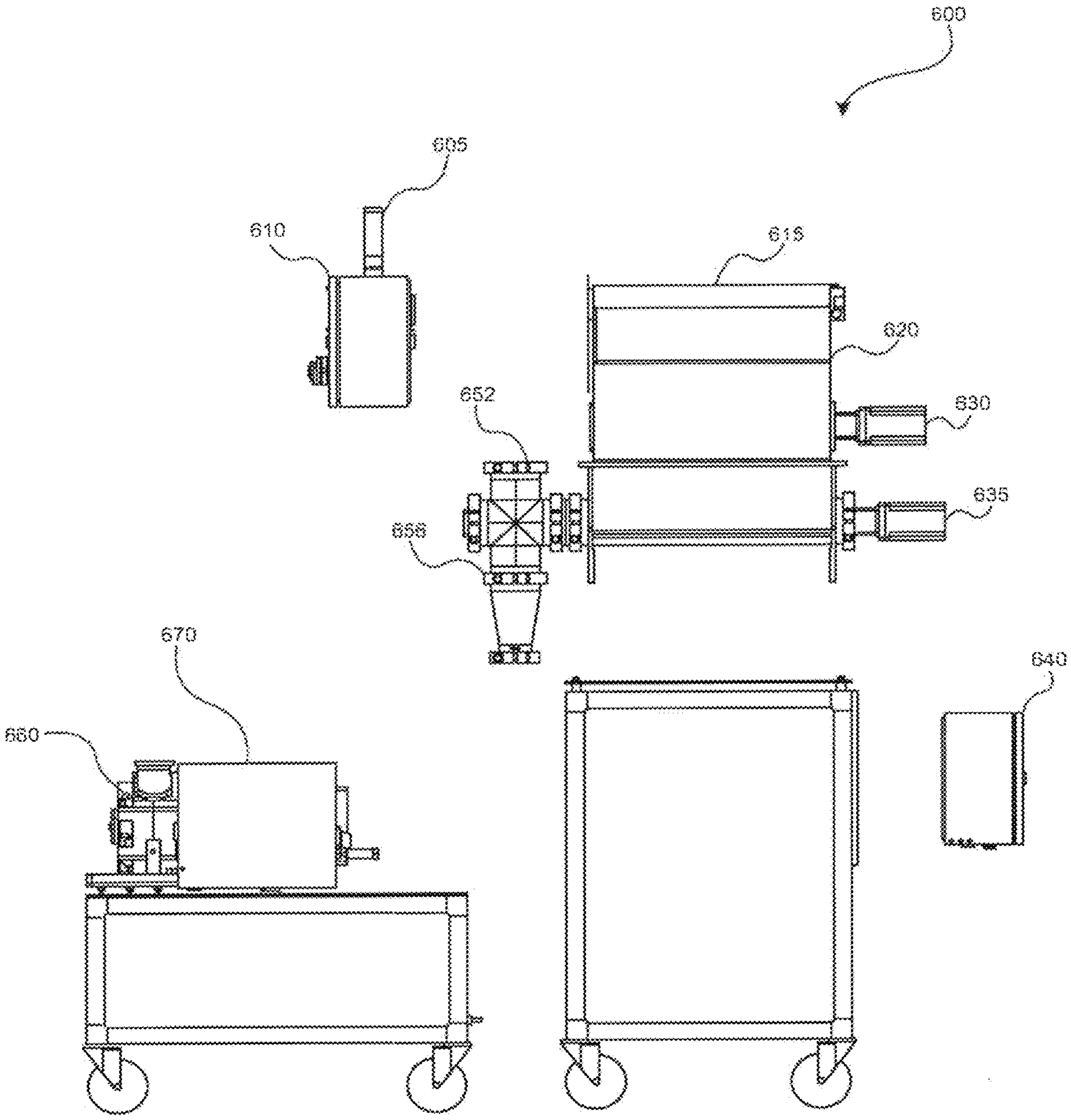

Referring to FIG. 8, a method of milling a material according to the present invention may generally comprise providing a material, such as to a conveyor in fluid communication with a hopper feeder or to a hopper feeder, transferring the material from the hopper feeder to a cutting mill, milling the material using the cutting mill, and transferring the milled material to a collection system, such as a cyclone separator and a drum top vacuum.

The milling system may be configured to achieve an average particle size having a lower limit of 0.01 mm, 0.1 mm, 1 mm, 10 mm, 100 mm, 1,000 mm, or more, and an upper limit of 1,000 mm, 100 mm, 10 mm, 1 mm, 0.1 mm, 0.01 mm, or less. For example, the average size may be 0.01-1000 mm, 0.01-100 mm, 0.01-10 mm, 0.05-8 mm, 0.1-5 mm, or 0.5-3 mm.

The milling system may comprise a temperature control system. The temperature control system may comprise a cooling system to maintain the material and/or portion of the milling system at a prespecified temperature. The temperature control system may be configured to achieve a desired temperature of the material before processing, during processing, and/or after processing. The temperature control system may reduce the temperature of the material below room temperature (15-25° C. or 20-25° C. or 23° C.) before processing. Reducing the temperature of the material may reduce/prevent degradation of certain chemical and/or physical properties of the material during processing. The temperature of the material before processing may have a lower limit of less than 0° C., 10° C., 20° C., 30° C., 40° C., or 50° C., and an upper limit of 50° C., 40° C., 30° C., 20° C., 10° C., or 0° C. For example, the temperature of the material before processing may be 40° C., 35° C., 30° C., 25° C., 20° C., 15° C., 12° C., 10° C., 9° C., 8° C., 7° C., or 6° C., or less. The temperature of the material during processing may have a lower limit of −45° C., −35° C., −30° C., −25° C., −20° C., −15° C., −10° C., −5° C., 0° C., 5° C., 10° C., 20° C., or more, and an upper limit of 0° C., −5° C., −10° C., −15° C., −20° C., −25° C., −35° C., −45° C., or less. The temperature of the material after processing may have a lower limit of less than 0° C., 10° C., 20° C., 30° C., 40° C., or 50° C., and an upper limit of 50° C., 40° C., 30° C., 20° C., 10° C., or 0° C. The temperature control system may maintain the material within a desired temperature range after processing suitable for packaging the milled material.

The controller may be configured to compare a first amount and/or flow rate corresponding to a first measured amount and/or flow rate to a first prespecified amount and/or flow rate, to compare a second amount and/or flow rate corresponding to a second measured amount and/or flow rate, and generate control signals for the hopper feeder, cutting mill, and/or collection system according to respective deviations therefrom. The control signals for the hopper feeder may adjust one or more of the agitator speed and feeding speed. The control signals for the cutting mail may adjust the grinding speed of the cutting rotor, fixed knives, and/or sieve cassettes. The control signals for the collection system may adjust one or more of the pressure, i.e., vacuum, generated by the vacuum source to cause the flow rate of the material to increase, decrease, or stop. The controller may generate control signals for at least one of the hopper feeder (e.g., conveyor, auger, and agitator), cutting mill (e.g., grinding speed), and/or collection system (e.g., pressure) according to the deviation of the second amount and/or flow rate from the prespecified amount and/or flow rate, to achieve a third measured amount and/or flow rate that deviates from the first specified amount and/or flow rate less than the second measured amount and/or flow rate deviates from the first specified amount and/or flow rate.

FIG. 8 illustrates a flow chart of the method of milling a material according to the present invention. The method comprises monitoring and adjusting certain parameters of the milling system to achieve repeated use and optimized process flow. By using the controller, each component of the milling system may be monitored to control the feeding stage, milling stage, and collection stage of the milling method to create a synergy among the stages to achieve a milled material having prespecified characteristics via a more efficient and/or cost-effective process.

The method according to the present invention may provide for a reduction of working time and an increase in throughput of the milling process relative to conventional methods. A single operator may operate and control the milling system by using the controller to autonomously and/or automatically control each component and stage of the process allowing for the operator to achieve the same yield of milled material in less time relative to a single operator operating a non-automated milling system. The method may be adapted to utilize additional and/or substitute components of the milling system. The controller may be configured to control the additional and/or substitute components based on a signal from the component communicating a process parameter of that component. The controller may collect and store process parameters and data collected from each of the components of the milling system to continuously (relative to a batch process), autonomously, and/or automatically mill the material is less time (e.g., due to less blockages, time adding additional material to the hopper feeder, time monitoring the collected amount of milled material) relative to conventional milling systems. The controller may act autonomously and/or automatically.

The volumetric hopper feeder system may comprise an auger motor control including power drive and a sensor to detect a jam; an internal capacitive sensor to sense the material height detection and indication to refill the hopper feeder with material; an agitator motor control including power drive and oscillation control; a safety lid interlock including a safety latch configured to stop the auger and/or agitator when the list is opened; a material flow sensor to sense when the mill is blocked (i.e., the flow rate of material is reduced and/or stopped), and when the hopper is empty and/or when the amount of material in the hopper is less than a prespecified amount (i.e., by weight, volume, and/or height); and a metallic sensor to detect metal in the material and configured to stop the mill (e.g., turning OFF the power to the mill) and flow of material from passing through the mill when metal is detected.

The standalone milling system may comprise a material flow sensor to sense when the mill is blocked (i.e., the flow rate of material is reduced and/or stopped), and when the hopper is empty and/or when the amount of material in the hopper is less than a prespecified amount (i.e., by weight, volume, and/or height); and a metallic sensor to detect metal in the material and configured to stop the mill (e.g., turning OFF the power to the mill) and flow of material from passing through the mill when metal is detected.

The milling system may comprise a conveyor, such as a hopper lid conveyor, to transfer material from the conveyor to the hopper feeder when the material in the hopper feeder achieves an amount of material in the hopper is less than a prespecified amount (i.e., by weight, volume, and/or height). The milling system may comprise a cutting mill operatively connected to the controller configured to activate the cutting blades, deactivate the cutting blades, control the speed of the cutting blades, and monitor the temperature of the cutting mill. The milling system may comprise at least one of a cyclone separator comprising a weight scale level sensor and a capacitive level (i.e., height) sensor; a vacuum system comprising a weight scale level sensor and a capacitive level (i.e., height) sensor; a drum top vacuum comprising a manual dual motor, a weight scale level sensor, and a capacitive level (i.e., height) sensor; and a vacuum system comprising a capacitive level (i.e., height) sensor, an internal filter cleaner, an airflow sensor, an airflow (i.e., flow rate) sensor, and a temperature sensor. The milling system may comprise pneumatic air conveyancing system comprising a 150 L storage container, a six inch rotary valve, and cyclone separator, and a capacitive level (e.g., height) sensor.

Figure 9:
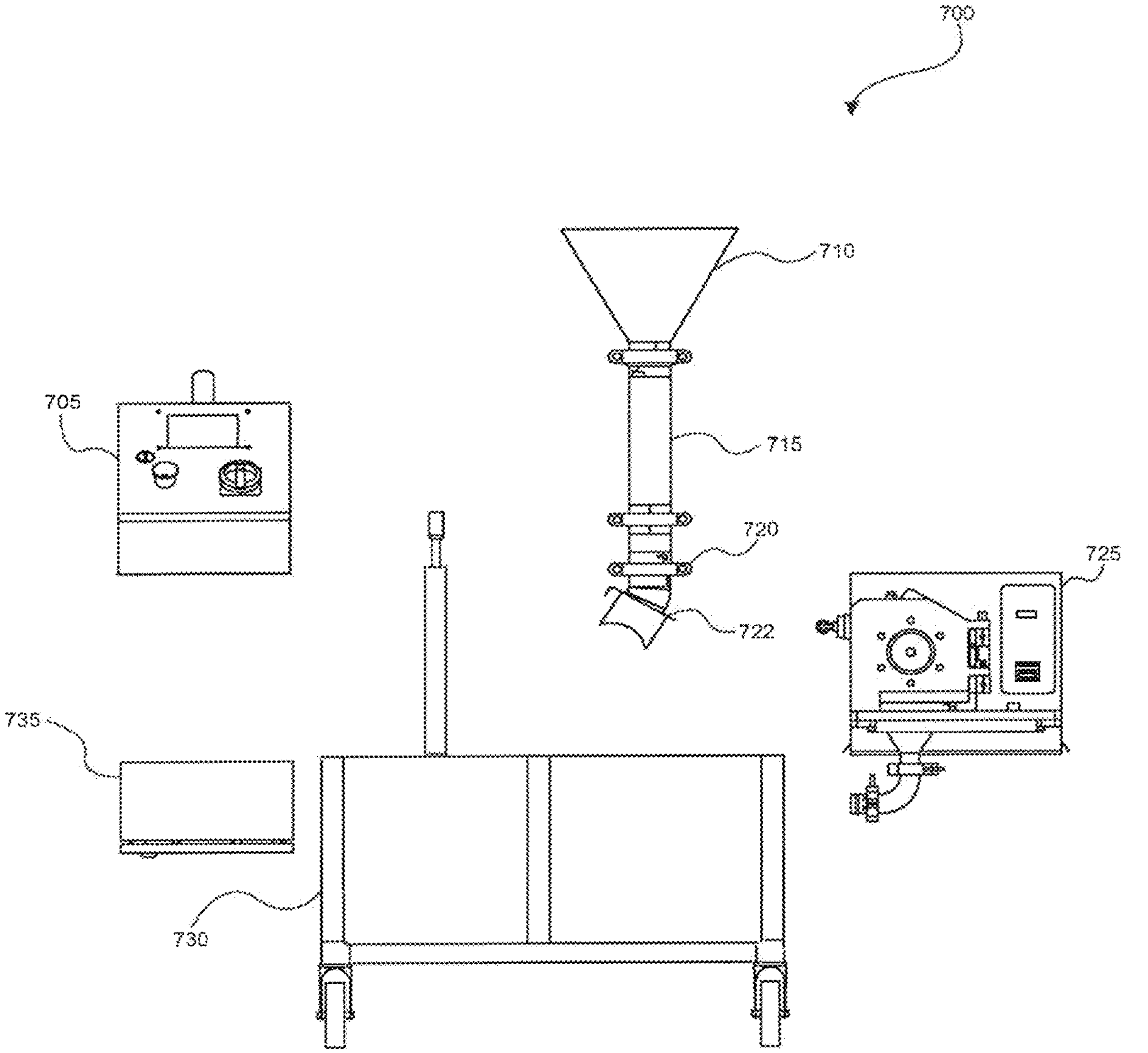

Referring to FIG. 9, the volumetric hopper feeder system may comprise, optionally, a pneumatic conveyor, a volumetric feeder assembly comprising an internal level sensor, an auger jam sensor, an agitator/oscillator, and an interlock safety lid, a laser sensor to sense material blockages in the flow path and when the amount of material in the hopper feeder is less than a prespecified amount; an cutting mill, a temperature sensor to sense the temperature of the cutting mill motor and/or material, a vacuum exhaust system, and an automated controller assembly including a controller operator interface and a main controller assembly. The standalone milling system may be positioned on a movable stand.

Figure 10:
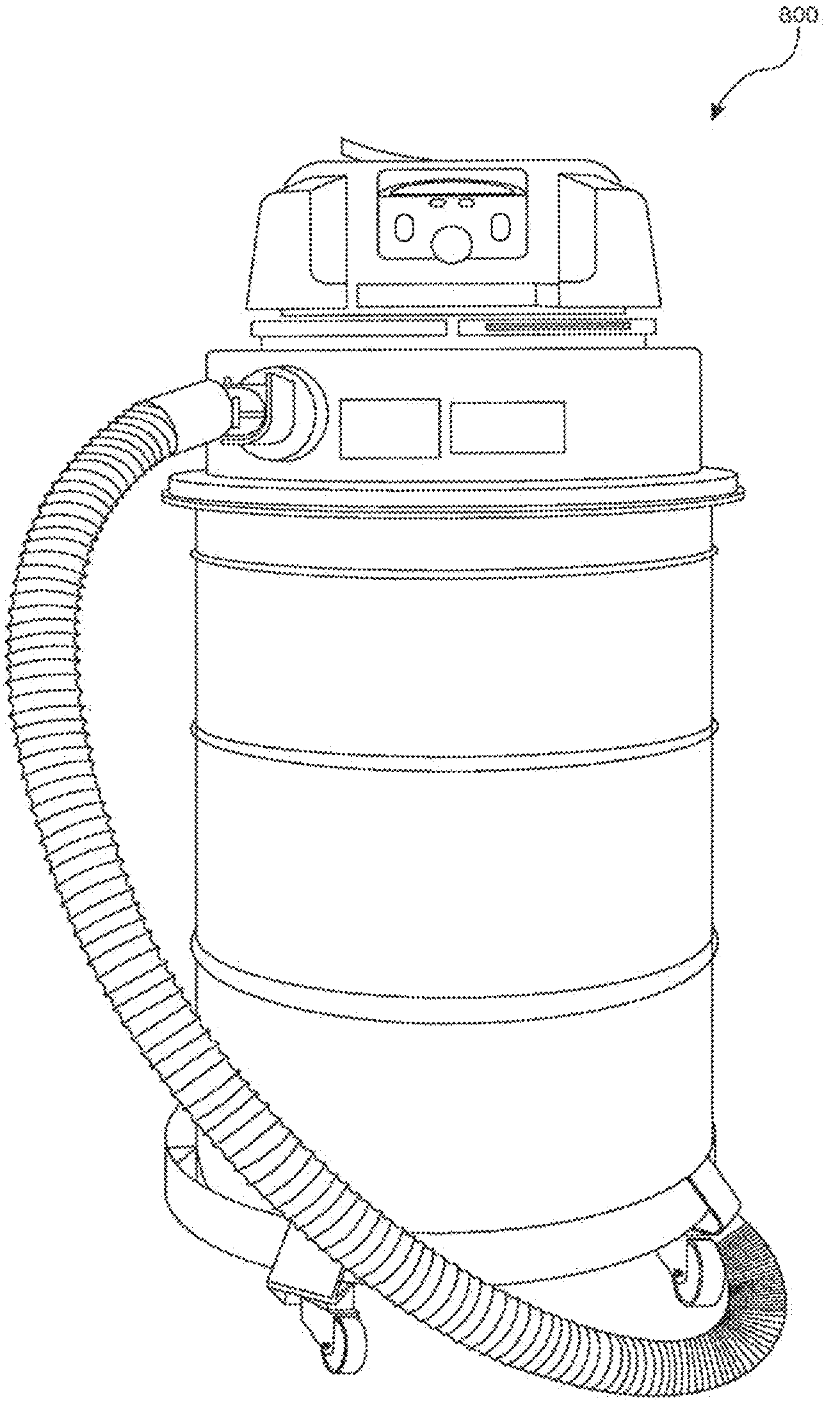

Referring to FIG. 10, the standalone milling system may comprise a cutting mill, a cutting mill input assembly including a large input assembly and a bulk/solids input assembly, a laser sensor to sense material blockage, a metallic sensor to sense metallic objects in the flow path and when the amount of material in the hopper feeder is less than a prespecified amount, a temperature sensor to sense the temperature of the cutting mill motor and/or material, a vacuum exhaust system, and a controller assembly. The standalone milling system may be positioned on a movable stand.

A control system according to the present invention may be operatively coupled to the milling system and comprise at least one sensor positioned along a flow path of the material through the milling system. The hopper feeder may comprise an inlet to the flow path and the collection system may comprise an outlet to the flow path. The at least one sensor may be in electrical communication with and operatively connected to a controller and at least one of the hopper feeder, mill, and collection system. The at least one sensor may be configured to sense at least one parameter of the material, hopper feeder, mill, and/or collection system. The at least one sensor may be configured to send a signal to the controller indicating the sensed parameter value. The at least one parameter may comprise an amount (e.g., a weight, a volume, a height), if any, temperature, moisture, and/or density of the material. The at least one sensor may comprise a weight sensor, level sensor, temperature sensor, humidity sensor, moisture sensor, light sensor, motion sensor, audio sensor, and/or magnetic sensor. For example, a magnetic sensor may sense no or less than a prespecified amount of material is present in a portion of the flow path. A weight sensor may sensor the weight of the material in the hopper feeder and/or collection container. The light (e.g., laser) sensor may sense the speed, if any, of the material passing through the flow path.

The control system may be adapted to receive a signal from a sensor indicating the sensed parameter value relative to a prespecified parameter value. The sensed parameter value may be the same as or different from the prespecified parameter value. The sensed parameter value may be less than, greater than, and/or equal to the prespecified parameter value. For example, the control system may be adapted to receive a signal from a sensor indicating the amount of material in the hopper feeder is less than a prespecified amount. The control system may be adapted to receive a signal from a sensor indicating the flow rate of the material through the mill or along a portion of the flow path is less than a prespecified flow rate. The control system may be adapted to receive a signal from a sensor indicating the temperature of the material in the mill is greater than or equal to a prespecified temperature. The control system may be adapted to receive a signal from a sensor indicating at least one of the rotational speed of the auger of the hopper feeder and the cutting surface of the mill relative to a prespecified rotational speed, respectively.

The control system may be adapted to control the operation of the hopper feeder, mill, and/or collection system. The controller may be adapted to decrease/stop the flow of the material to the mill when the signal received from the sensor indicates that the amount of material in the hopper feeder is less than a prespecified amount. The controller may be adapted to increase the flow of the material to the mill when the signal received from the sensor indicates that the flow rate of the material through the mill is less than a prespecified flow rate. The controller may be adapted to slow/stop the flow of the material to the mill when the signal received from the sensor indicates that the flow rate of the material through the mill is less than a prespecified flow rate. The controller may be adapted to slow/stop the flow of the material to the mill when the signal received from the sensor indicates that the temperature of the material in the mill is equal to or greater than a prespecified temperature. The controller may be adapted to slow/stop the flow of the material to the collection container when the signal received from the sensor indicates that the amount of material in the collection container is equal to or greater than a prespecified volume. For example, the controller may be adapted to slow/stop the flow of the material to the collection container when the signal received from the sensor indicates that the amount of material in the collection container is equal to or greater than a prespecified weight. The controller may be adapted to slow/stop the flow of the material to the collection container when the signal received from the sensor indicates that the height of material in the collection container is equal to or greater than a prespecified height in the collection container. The controller may be adapted to slow/stop the flow of the material to the collection container when the signal received from the sensor indicates that the weight of material in the collection container is equal to or greater than a prespecified weight in the collection container.

The controller may comprise a single microprocessor or multiple microprocessors that include components for controlling the milling systems and components thereof, including the hopper feeder, mill, and collection system, as well as other operations of milling system based on input from an operator of the milling system using a user interface and/or on sensed or other prespecified operational parameters. Thus, for example, the controller may be operatively connected to an auger, agitator, and/or conveyor of the hopper feeder and to a cutting blade of the mill, and is adapted to independently control the speed and operation thereof. The controller may be programmed with information about the various relative positions, configurations and dimensions of the various components of the milling system with respect to the amount and position of the material along the flow path, including the auger, agitator, and/or conveyor of the hopper feeder and the vacuum source of the collection system so that the controller may determine the specific adjustments of each of the various components of the milling system to achieve a milled material having prespecified characteristics using a continuous process having less downtime relative to conventional processes. The controller may comprise or may be associated with a memory and a data input component such as a touch screen, a keyboard and/or a plurality of actuating buttons for receiving input from the operator of the milling system. The controller may comprise a data output component such as a display screen, a secondary storage device, a processor and other components for executing an application. Various circuits may be associated with and operatively connected to the controller, such as power supply circuitry and other circuitry. The controller may comprise a general purpose computer or machine microprocessor capable of controlling numerous milling system functions.

The milling system may comprise a controller that is configured in such a manner that the presence or lack thereof or flow rate of the material in or along the flow path sensed by the at least one sensor may be continuously compared to a prespecified amount and/or flow rate, and control signals may be generated for at least one of the conveyor, hopper feeder, cutting mill, and collection system, including the vacuum source, according to the deviation of the measured amount and/or flow rate from the prespecified amount and/or flow rate. Here, "control signals" may be understood to mean the signals or data useful for controlling the hopper feeder, cutting mill, collection system and/or their associated assemblies, such as auger, agitator, vacuum, and conveyor units. The hopper feeder, cutting mill, and associated assemblies may cause the measured flow rate to increase or decrease according to the control signals to reduce the deviation from the prespecified flow rate. The control signal may comprise a plurality of control signals such that one of the plurality of control signals may be functionally assigned to the hopper feeder and/or associated assemblies and another one of the plurality of control signals may be functionally assigned to the cutting mill and/or associated assemblies.

The control signals may cause additional material to be transferred to the hopper feeder. For example, the control signals may cause material on the conveyor to be deposited into the hopper feeder by activating the corresponding motor assembly of the conveyor. The control signals may reduce/prevent additional material from being transferred to the hopper feeder. For example, the control signals may deactivate the motor assembly of the conveyor to cause no additional material to be transferred from the conveyor to the hopper feeder. The control signals may increase the speed of the agitator and/or auger to transfer additional material from the hopper feeder to the cutting mill by activating/increasing the speed of the corresponding motor assembly of the agitator and/or auger. The control signals may stop/decrease the speed of the agitator and/or auger to reduce/prevent the transfer of additional material from the hopper feeder to the cutting mill by deactivating/decreasing the speed of the corresponding motor assembly of the agitator and/or auger.

The controller is configured in such a manner that, according to the deviation of the amount and/or flow rate determined by the at least one sensor from the prespecified amount and/or flow rate, the controller generates control signals for the cutting mill which is functionally assigned to the cutting rotor, fixed knives, and/or sieve cassettes. The controller is configured to adjust the speed of the cutting mill to achieve the prespecified amount and/or flow rate. The control signals may cause the cutting mill to comminute more or less material by adjusting the cutting speed. For example, the control signals may increase the speed of the cutting blades to comminute material at a greater rate by activating/increasing the speed of the corresponding motor assembly of the cutting blades. The control signals may stop/decrease the speed of the cutting blades to stop/reduce the comminuting of the material at a lower rate by deactivating/decreasing the speed of the corresponding motor assembly of the cutting blades.

The controller may comprise an independent module, or at least a portion of it may be part of the central control and computing unit of the milling system. The control and computing unit may comprise, for example, a general processor, a digital signal processor (DSP) for continuously processing digital signals, a microprocessor, an application-specific integrated circuit (ASIC), an integrated circuit consisting of logic elements (FPGA), or other integrated circuits (IC) or hardware components to carry out the control of the feeder, auger, and agitator devices. A data processing program (software) may run on the hardware components. A combination of the various components is also possible.

The control system may be implemented by one or more computing devices such as computers, PCs, server computers configured to provide various types of services and/or data stores in accordance with aspects of the described subject matter. Exemplary sever computers may include, without limitation: web servers, front end servers, application servers, database servers, domain controllers, domain name servers, directory servers, and/or other suitable computers.

Components of the control system may be implemented by software, hardware, firmware or a combination thereof. For example, the control system may include components implemented by computer-executable instructions that are stored on one or more computer-readable storage media and that are executed to perform various steps, methods, and/or functionality in accordance with aspects of the described subject matter.

The control system may include a controller, memory, additional hardware storage, input devices, and output devices. Input devices can include one or more of the exemplary input devices described above and/or other type of input mechanism and/or device. Output devices can include one or more of the exemplary output devices described above and/or other type of output mechanism and/or device.

The control system may contain one or more communication interfaces that allow control system to communicate with other computing devices and/or other computer systems. The control system may include and/or run one or more computer programs implemented, for example, by software, firmware, hardware, logic, and/or circuitry of the control system may. Computer programs can include an operating system implemented, for example, by one or more exemplary operating systems described above and/or other type of operating system suitable for running on computing device. Computer programs can include one or more applications.

In general, a computer system or computing device may include one or more processors and storage devices (e.g., memory and disk drives) as well as various input devices, output devices, communication interfaces, and/or other types of devices. A computer system or computing device can also include a combination of hardware and software. It should be appreciated that various types of computer-readable storage media can be part of a computer system or computing device. As used herein, the terms "memory", "computer-readable storage media" and "computer-readable storage medium" do not mean and unequivocally exclude a propagated signal, a modulated data signal, a carrier wave, or any other type of transitory computer-readable medium. The milling system may include a processor configured to execute computer-executable instructions and a computer-readable storage medium (e.g., memory and/or additional hardware storage) storing computer-executable instructions configured to perform various steps, methods, and/or functionality in accordance with aspects of the present invention.

Computer-executable instructions may be embodied and/or implemented in various ways such as by a computer program (e.g., client program and/or server program), a software application (e.g., client application and/or server application), software code, application code, source code, executable files, executable components, routines, application programming interfaces (APIs), functions, methods, objects, properties, data structures, data types, and/or the like. Computer-executable instructions may be stored on one or more computer-readable storage media and can be executed by one or more processors, computing devices, and/or computer systems to perform particular tasks or implement particular data types in accordance with aspects of the present invention.

The milling system may implement and utilize one or more program modules. Generally, program modules include routines, programs, objects, components, data structures, etc., that perform particular tasks or implement particular abstract data types.

The milling system may be implemented as a distributed computing system or environment in which components are located on different computing devices that are connected to each other through network (e.g., wired and/or wireless) and/or other forms of direct and/or indirect connections. In such distributed computing systems or environments, tasks can be performed by one or more remote processing devices, or within a cloud of one or more devices, that are linked through one or more communications networks. In a distributed computing environment, program modules can be located in both local and remote computer storage media including media storage devices. Still further, the aforementioned instructions can be implemented, in part or in whole, as hardware logic circuits, which can include a processor.

The milling system may be implemented by one or more computing devices such as computers, PCs, server computers configured to provide various types of services and/or data stores in accordance with aspects of the present invention. Exemplary sever computers can include, without limitation: web servers, front end servers, application servers, database servers, domain controllers, domain name servers, directory servers, and/or other suitable computers.

Components of the milling system may be implemented by software, hardware, firmware or a combination thereof. For example, the milling system may include components implemented by computer-executable instructions that are stored on one or more computer-readable storage media and that are executed to perform various steps, methods, and/or functionality in accordance with aspects of the present invention.

The milling system may include a controller, memory, additional hardware storage, input devices, and output devices. Input devices may include one or more of the exemplary input devices described above and/or other type of input mechanism and/or device. Output devices may include one or more of the exemplary output devices described above and/or other type of output mechanism and/or device, such as a display.

The milling system may contain one or more communication interfaces that allow the milling system to communicate with other computing devices and/or other computer systems. The milling system may include and/or run one or more computer programs implemented, for example, by software, firmware, hardware, logic, and/or circuitry of the milling system. Computer programs can include an operating system implemented, for example, by one or more exemplary operating systems described above and/or other type of operating system suitable for running on computing device. Computer programs can include one or more applications.

The terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

The terms "communicate" and "communicating" include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "connect," "connected," "connection," "coupled," "coupled to," and "coupled with" each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EE-PROM), a computer-readable medium, or the like.

The term "network" means both networks and inter-networks of all kinds, including the Internet, and is not limited to any particular network or inter-network.

The term "operable" means to perform a function whenever the circuitry comprises the necessary hardware and code (if any is necessary) to perform the function, regardless of whether performance of the function is disabled or not enabled (e.g., by an operator-configurable setting, factory trim, etc.).

The term "processor" means processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with, a memory device.

An automated milling system according to the present invention may comprise an inlet in fluid communication with an outlet, wherein the hopper comprises the inlet, the hopper may be in fluid communication with the mill, the mill may be in fluid communication with the cyclone separator, the cyclone separator may comprise the outlet in fluid communication with the collection container. The material may flow through the milling system via vacuum from the vacuum source.

An automated method of milling a material according to the present invention may comprise providing a milling system having an inlet in fluid communication with an outlet, wherein the hopper comprises the inlet, the hopper may be in fluid communication with the mill, the mill may be in fluid communication with the cyclone separator, the cyclone separator may comprise the outlet in fluid communication with the collection container. The material may flow through the milling system via vacuum from the vacuum source.

A semi-automated milling system according to the present invention may comprise an inlet in fluid communication with an outlet, wherein the feeding attachment comprises the inlet, the feeding attachment may be in fluid communication with the mill, the mill may be in fluid communication with the cyclone separator, the cyclone separator may comprise the outlet in fluid communication with the collection container. The material may flow through the milling system via vacuum from the vacuum source.

A semi-automated method of milling a material according to the present invention may comprise providing a milling system having an inlet in fluid communication with an outlet, wherein the feeding attachment comprises the inlet, the feeding attachment may be in fluid communication with the mill, the mill may be in fluid communication with the cyclone separator, the cyclone separator may comprise the outlet in fluid communication with the collection container. The material may flow through the milling system via vacuum from the vacuum source.

The material may comprise agricultural materials, herbal materials, food materials, chemicals and pharmaceutical materials, animal feed, bones, nuts, seeds, plastics/polymers, pigments, rubber, paper, post secondary waste, recycling material, toxic substances, woods, leaves, and/or grasses. For example, the material may comprise plant materials, such as *cannabis*. The materials may comprise materials from the following industries: pharmaceutical, environment, *cannabis*, metallurgy, mining, foodstuffs, plastics and textiles, ceramics and glass, geology and mineralogy, agriculture and forestry, mechanochemistry, construction materials, biology, and chemistry. The material may be fatty, oily, hard-abrasive, hard-brittle, medium-hard, soft, brittle, tough, fibrous, temperature sensitive, and/or moist.

EXAMPLE

The milling system according to the present invention may comminute large volumes of *cannabis* plant material to a prespecified particle size. The plant material may be fed into the milling system through large funnel for fast throughput. The negative pressure in the milling system may provide a continuous flow through the cutting rotor and the selected sieve cassette for precise particle sizing, and may reduce/prevent the material from clogging the flow path. The milling system may be characterized by a high throughput of up to 60 L/h when large collection containers of up to 10 L are used. The milling system may be configures for more efficient processing of the material for a period of time relative to a conventional milling system by being configured for unrestricted accessibility of the cutting chamber, having a quickly removable cutting rotor and sieve cassette, and a generally easy-to-clean grinding chamber.

Referring to FIG. 14, the milling system may comprise a 2 mm screen size to provide for a greater packing density, increased extraction speed, and/or improved oil constitution, while allowing the material to be constantly feed material into the mill itself, thus increasing work efficiency. The 300 rpm blade speed provides a narrow particle size distribution and avoids thermal damage and loss of volatiles from the material. The moisture content of the material being milled is dry, less than 15%, to reduce/prevent clogging the milling sieve. At least one complete extraction load of at least 4.5 kg may be milled before stopping the system to clean the sieve and behind the milling wheel to reduce/prevent buildup of chlorophyll and *cannabis* residue.

Each of the characteristics and examples described above, and combinations thereof, may be said to be encompassed by the present invention. The present invention is thus drawn to the following non-limiting aspects:

Aspect 1. 1. A milling system comprising: a hopper feeder configured to receive a material comprising an agitator and an agitator motor assembly configured to be used as a power drive for the agitator to agitate the material in the hopper, a level sensor to detect an amount of the material in the hopper and when the amount of the material in the hopper is less than a prespecified amount, an auger and an auger motor assembly configured to be used as a power drive for the auger to transfer the material from the hopper to a cutting mill; a connection assembly to receive the material from the hopper feeder and transfer the material to a cutting mill; a cutting mill to receive the material from the connection assembly and comminute the material to a prespecified particle size, the cutting mill comprising a cutting chamber including one of a cutting rotor, a fixed knife, and a sieve cassette, and a corresponding cutting motor assembly configured to be used as a power drive for the one of the cutting rotor, fixed knife, and sieve cassette to comminute the material, an input sensor assembly to detect the presence of material in the cutting chamber, to monitor a flow rate of the material through the cutting mill, and/or to detect a blockage of the cutting mill, a metal detection sensor to detect metal in material in the cutting chamber and/or a lack of material in the cutting chamber, and a temperature sensor to monitor the temperature of the cutting chamber and/or the material therein; a collection system comprising a collection container to receive the material from the cutting mill, a level sensor to detect the weight and/or height of the material in the collection container, a vacuum source to generate a vacuum from the cutting mill to the collection system, and a vacuum pressure sensor to monitor the pressure of the vacuum; and a controller that is: (a) operatively connected to the motor assemblies for the hopper feeder; (b) adapted to control the operation of the motor assemblies for the hopper feeder; (c) operatively attached to the level sensor of the hopper feeder; (d) adapted to receive a signal indicating the amount of material in the hopper feeder; (e) adapted to cause at least one of the motor assemblies to start or increase a driving force to the at least one of the feeding auger, grind auger, and agitator, respectively, when the signal received from the level sensor indicates that the amount of material in the hopper is less than a prespecified amount and to stop or decrease the driving force to the at least one of the feeding auger, grind auger, and agitator when the signal received from the level sensor indicates that the amount of material in the hopper is equal to or greater than a prespecified amount.

Aspect 2. The milling system of any of the foregoing aspects, wherein the driving force to the at least one of the feeding auger, grind auger, and agitator independently adjusts the speed, strength, and/or time of each of the feeding auger, grind auger, and agitator.

Aspect 3. The milling system of any of the foregoing aspects comprising a conveyor and a conveyor motor assembly configured to be used as a power drive for the conveyor to transfer the material to the hopper.

Aspect 4. The milling system of any of the forgoing aspects, wherein the controller is: (a) operatively connected to the motor assembly for the conveyor; (b) adapted to control the operation of the motor assembly for the conveyor; (c) operatively attached to the level sensor of the hopper feeder; (d) adapted to receive a signal indicating the amount of material in the hopper feeder; (e) adapted to cause the motor assembly to start or increase a driving force to the conveyor when the signal received from the level sensor indicates that the amount of material in the hopper is less than a prespecified amount and to stop or decrease the driving force to the conveyor when the signal received from the level sensor indicates that the amount of material in the hopper is equal to or greater than a prespecified amount.

Aspect 5. The milling system of any of the going aspects, wherein the driving force to the conveyor independently adjusts the speed, vibration, strength, and/or time of the conveyor.

Aspect 6. The milling system of any of the foregoing aspects, wherein the controller is: (a) operatively connected to the motor assembly for the cutting mill; (b) adapted to control the operation of the motor assembly for the cutting mill; (c) operatively attached to at least one of the input sensor of the cutting mill, the metal detection sensor of the cutting mill, and the temperature sensor of the cutting mill; (d) adapted to receive a signal indicating the amount of material in the cutting chamber, and/or a signal indicating the temperature of the cutting chamber and/or the material therein; (e) adapted to cause the motor assembly to start or increase a driving force to at least one of the cutting rotor, fixed knife, and sieve cassette when the signal received from the input sensor indicates the presence of material in the cutting chamber and/or the amount of material in the cutting chamber is equal to or greater than a prespecified amount, to stop or decrease the driving force to the at least one of the cutting rotor, fixed knife, and sieve cassette when the signal received from at least one of the input sensor and metal detection sensor indicates that the amount of material in the cutting chamber is less than a prespecified amount, and to stop the driving force to the at least one of the cutting rotor, fixed knife, and sieve cassette when the signal received from the temperature sensor indicates that the temperature of the cutting chamber and/or material therein is greater than a prespecified temperature.

Aspect 7. The milling system of any of the going aspects, wherein the driving force to the at least one of cutting rotor, fixed knife, and sieve cassette independently adjusts the speed, strength, and/or time that the material is in contact with the at least one of cutting rotor, fixed knife, and sieve cassette.

Aspect 8. The milling system of any of the foregoing aspects, wherein the controller is: (a) operatively connected to the motor assembly for the collection system; (b) adapted to control the operation of the motor assembly for the collection system; (c) operatively attached to the level sensor; (d) adapted to receive a signal indicating the amount of material in the collection container; (e) adapted to cause the motor assembly to start or increase a driving force to the vacuum source when the signal received from the level sensor indicates the amount of material in the collection container is less than a prespecified amount and to stop or decrease the driving force to the vacuum source when the signal received from the level sensor indicates that the amount of material in the collection container is equal to or greater than a prespecified amount.

Aspect 9. The milling system of any of the foregoing aspects, wherein the collection system a cyclone separator having a negative pressure vacuum sufficient to transfer the material to a collection container.

Aspect 10. The milling system of any of the foregoing aspects comprising a connection assembly to receive the material from the cutting mill and transfer the material to the collection container and having a pressure generated by the pneumatic source sufficient to transfer the material to the collection container.

Aspect 11. The milling system of any of the foregoing aspects comprising flow path having an inlet in fluid communication with an outlet, wherein the hopper feeder comprises the inlet, the hopper is in fluid communication with the cutting mill, the cutting mill is in fluid communication with the collection system, and the collection system comprises the outlet.

Aspect 12. The milling system of any of the foregoing aspects, wherein the controller is configured to, in response to signals received from at least one of the sensors, maintain a prespecified flow rate of the material though the flow path.

Aspect 13. The milling system of any of the foregoing aspects wherein the controller is configured to, in response to signals received from at least one of the sensors, autonomously and/or automatically maintain a prespecified flow rate of the material though the flow path.

Aspect 14. The milling system of any of the foregoing aspects, wherein the controller is configured to, in response to signals received from at least one of the sensors, stop the flow of the material along the flow path.

Aspect 15. The milling system of any of the foregoing aspects comprising a temperature control system configured to maintain the material in the cutting chamber at a temperature of −45° C. to 25° C.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments have been illustrated and described, it would be obvious to those skilled in the art that various other changes and modifications may be made without departing from the spirit and scope of the invention. Those skilled in the art will recognize or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

REFERENCE NUMBERS

| | |
|---|---|
| 5 | Light stack indicator |
| 10 | Display enclosure assembly |
| 15 | Hopper feeder |
| 20 | Hopper lid safety interlock |
| 25 | Agitator assembly |
| 30 | Agitator motor assembly |
| 35 | Auger motor assembly |
| 40 | Controller |
| 45 | Cart |
| 50 | Variable flight auger |
| 52 | Filter airflow port |
| 54 | Direct connection cross assembly |
| 56 | Input sensor assembly |
| 60 | Input assembly |
| 100 | System |
| 200 | Vacuum exhaust system |
| 205 | SAMS control display |
| 210 | Input funnel |
| 215 | Funnel neck |
| 220 | Metal sensor |
| 221 | Cutting mill motor assembly |
| 223 | Cutting chamber |
| 225 | Cutting mill |
| 230 | Cart |
| 235 | Controller |
| 300 | Vacuum |
| 305 | Vacuum head |
| 310 | Connection to cutting mill |

-continued

| | |
|---|---|
| 315 | Level sensor |
| 400 | Cyclone separator |
| 405 | Vacuum exit |
| 410 | Cyclone separator head |
| 415 | Product input |
| 420 | Collection container |
| 425 | Scale |
| 500 | Vacuum |
| 505 | Vacuum power head |
| 510 | Connect to controller |
| 515 | Mounts to VHF lid |
| 600 | System |
| 605 | Light stack indicator |
| 610 | Display enclosure assembly |
| 615 | Hopper feeder |
| 620 | Agitator assembly |
| 630 | Agitator motor assembly |
| 635 | Auger motor assembly |
| 640 | Controller |
| 652 | Filter airflow port of Variable flight auger |
| 654 | Direct connection cross assembly |
| 656 | Input sensor assembly |
| 660 | Input assembly |
| 670 | Input assembly controller |
| 700 | Funnel system |
| 710 | Input funnel |
| 715 | Funnel neck |
| 720 | Metal sensor |
| 722 | Connector |
| 725 | Cutting mill |
| 730 | Cart |
| 735 | Controller |
| 800 | Vacuum assembly |
| 900 | Vacuum assembly |
| 1000 | Collection system |

What is claimed is:

1. A method of milling a material, the method comprising:

providing the material to a hopper feeder configured to receive the material, the hopper feeder comprising an agitator and an agitator motor assembly configured to be used as a power drive for the agitator to agitate the material in the hopper feeder, a level sensor to detect an amount of the material in the hopper feeder and when the amount of the material in the hopper feeder is less than a prespecified amount, and an auger and an auger motor assembly configured to be used as a power drive for the auger to transfer the material from the hopper feeder to a cutting mill;

providing the material to the cutting mill configured to receive the material from the hopper feeder and comminute the material to a prespecified particle size, the cutting mill comprising a cutting chamber including one of a cutting rotor, a fixed knife, and a sieve cassette, and a corresponding cutting motor assembly configured to be used as a power drive for the one of the cutting rotor, fixed knife, and sieve cassette to comminute the material, an input sensor assembly to detect the presence of material in the cutting chamber, to monitor a flow rate of the material through the cutting mill, and to detect a blockage of the cutting mill, a metal detection sensor to detect metal in material in the cutting chamber and a lack of material in the cutting chamber, and a temperature sensor to monitor the temperature of the cutting chamber and the material therein;

providing the material to a collection system configured to receive the material from the cutting mill, the collection system comprising a collection container to receive the material from the cutting mill, a level sensor to detect the weight and height of the material in the collection container, a vacuum source to generate a vacuum from the cutting mill to the collection system, and a vacuum pressure sensor to monitor the pressure of the vacuum;

increasing a driving force of at least one of the motor assemblies of the feeding auger, grind auger, and agitator when the level sensor indicates that the amount of material in the hopper is less than a prespecified minimum amount; and decreasing the driving force to the at least one of the motor assemblies of the feeding auger, grind auger, and agitator when the level sensor indicates that the amount of material in the hopper is equal to or greater than a prespecified maximum amount.

2. The method of claim 1 comprising transferring the material to the hopper feeder via a conveyor and a conveyor motor assembly configured to be used as a power drive for the conveyor; and increasing a driving force to the conveyor when the amount of material in the hopper is less than a prespecified amount.

3. The method of claim 1 comprising transferring the material to the hopper feeder via a conveyor and a conveyor motor assembly configured to be used as a power drive for the conveyor; and decreasing a driving force to the conveyor when the amount of material in the hopper is equal to or greater than a prespecified amount.

4. The method of claim 1 comprising increasing a driving force to at least one of the cutting rotor, fixed knife, and sieve cassette when the amount of material in the cutting chamber is equal to or greater than a prespecified amount.

5. The method of claim 1 comprising decreasing a driving force to at least one of the cutting rotor, fixed knife, and sieve cassette when the amount of material in the cutting chamber is less than a prespecified amount.

6. The method of claim 1 comprising decreasing a driving force to at least one of the cutting rotor, fixed knife, and sieve cassette when the when the temperature of the cutting chamber is greater than a prespecified temperature.

7. The method of claim 1 comprising decreasing a driving force to at least one of the cutting rotor, fixed knife, and sieve cassette when the temperature of the material in the cutting chamber is greater than a prespecified temperature.

8. The method of claim 1 comprising increasing a driving force to the vacuum source when the amount of material in the collection container is less than a prespecified amount.

9. The method of claim 1 comprising decreasing a driving force to the vacuum source when the amount of material in the collection container is equal to or greater than a prespecified amount.

10. The method of claim 1 comprising maintaining a prespecified flow rate of the material though the flow path.

11. The method of claim 1 comprising autonomously maintaining a prespecified flow rate of the material though the flow path.

12. The method of claim 1 comprising automatically maintaining a prespecified flow rate of the material though the flow path.

13. The method of claim 1 comprising stopping the flow of the material along the flow path.

* * * * *